(12) United States Patent
Ukai et al.

(10) Patent No.: US 7,925,870 B2
(45) Date of Patent: *Apr. 12, 2011

(54) RETURN TARGET ADDRESS PREDICTION BY MOVING ENTRY POINTER TO RETURN STACK POPPED AT COMPLETION TO DEEPER ONE AT RETURN INSTRUCTION FETCH

(75) Inventors: Masaki Ukai, Kanagawa (JP); Aiichiro Inoue, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/337,870

(22) Filed: Jan. 8, 2003

(65) Prior Publication Data

US 2003/0097549 A1    May 22, 2003

Related U.S. Application Data

(62) Division of application No. 09/456,523, filed on Dec. 8, 1999, now Pat. No. 6,530,016.

(30) Foreign Application Priority Data

Dec. 10, 1998  (JP) .................................. 10-350924

(51) Int. Cl.
*G06F 9/38* (2006.01)
(52) U.S. Cl. ......... 712/237; 712/238; 712/239; 712/240
(58) Field of Classification Search .................. 712/243, 712/237, 238, 239, 240, 242
See application file for complete search history.

(56) References Cited

U.S. PATENT DOCUMENTS

| 5,276,882 A | | 1/1994 | Emma et al. ................... 712/240 |
| 5,313,634 A | * | 5/1994 | Eickemeyer ................... 712/240 |
| 5,454,087 A | | 9/1995 | Narita et al. ................... 712/240 |
| 5,584,001 A | * | 12/1996 | Hoyt et al. ..................... 712/238 |
| 5,604,877 A | * | 2/1997 | Hoyt et al. ..................... 712/243 |
| 5,623,614 A | * | 4/1997 | Van Dyke et al. ............ 712/240 |
| 5,706,491 A | | 1/1998 | McMahan | |

(Continued)

FOREIGN PATENT DOCUMENTS

JP      53-120241       10/1978

(Continued)

OTHER PUBLICATIONS

Office Action from Japanese Patent Office dated Jul. 15, 2003.

(Continued)

*Primary Examiner* — Kenneth S Kim
(74) *Attorney, Agent, or Firm* — Staas & Halsey LLP

(57) ABSTRACT

An instruction fetch control apparatus includes an instruction completion notifier, and an entry designation unit predicting a return address of a subroutine during an instruction fetching. The entry designation unit computes a designate entry position in a return address stack by, changing the designate entry to indicate a one-step shallower entry when a call instruction is predicted during the instruction fetching, changing the designate entry independently of a push or pop operation to indicate a one-step deeper entry when a return instruction is predicted during an instruction fetching, and changing the designate entry depending upon a push and a pop operation when a call and return instruction is completed, thereby keeping a position of the designate entry. The entry designation unit designates an entry as predicted return address of a subroutine when the fetched instruction hitsin a branch history and determined as a return instruction.

11 Claims, 28 Drawing Sheets

11 : INSTRUCTION ADDRESS REGISTER, 12 : INSTRUCTION ADDRESS GENERATION CIRCUIT, 13,76 : SELECTORS, 17 : BUFFER
18 : BRANCH HISTORY, 19 : RETURN ADDRESS STACK, 71 : ADDRESS REGISTER
(1) INSTRUCTION ADDRESS OF COMPLETED BRANCH INSTRUCTION (2) BRANCHED-TO ADDRESS OF COMPLETED BRANCH INSTRUCTION
(3) SIGNAL INDICATING VALIDITY/INVALIDITY OF ENTRY
(5) SIGNAL INDICATING THAT COMPLETED INSTRUCTION IS SUBROUTINE RETURN INSTRUCTION
(6) INSTRUCTION LENGTH OF COMPLETED SUBROUTINE CALL INSTRUCTION (8) PREDICTED BRANCHED-TO ADDRESS (RETURN ADDRESS)

U.S. PATENT DOCUMENTS

| | | | | |
|---|---|---|---|---|
| 5,842,008 A | * | 11/1998 | Gochman et al. | 712/240 |
| 5,864,707 A | * | 1/1999 | Tran et al. | 712/23 |
| 5,964,868 A | * | 10/1999 | Gochman et al. | 712/234 |
| 5,974,543 A | * | 10/1999 | Hilgendorf et al. | 712/240 |
| 6,151,671 A | * | 11/2000 | D'Sa et al. | 712/239 |
| 6,170,054 B1 | | 1/2001 | Poplingher | 712/242 |
| 6,253,315 B1 | * | 6/2001 | Yeh | 712/238 |

FOREIGN PATENT DOCUMENTS

| | | |
|---|---|---|
| JP | 4-233632 | 8/1992 |
| JP | 5-120013 | 5/1993 |
| JP | 6-59888 | 3/1994 |

OTHER PUBLICATIONS

U.S. Appl. No. 09/456,523, filed Dec. 8, 1999, Masaki Ukai, Fujitsu Limited.

U.S. Appl. No. 11/207,825, filed Aug. 22, 2005, Masaki Ukai, Fujitsu Limited.

U.S. Office Action mailed Jul. 25, 2002 in parent U.S. Appl. No. 09/456,523 (now Patent No. 6530016).

U.S. Office Action (Notice of Allowance) mailed Oct. 8, 2002 in parent U.S. Appl. No. 09/456,523 (now Patent No. 6530016).

U.S. Office Action (Response to Rule 312 Communication) mailed Jan. 28, 2003 in parent U.S. Appl. No. 09/456,523 (now Patent No. 6530016).

U.S. Office Action (Issue Notification) mailed Feb. 13, 2003 in parent U.S. Appl. No. 09/456,523 (now Patent No. 6530016).

U.S. Office Action (Issue Notification) mailed Mar. 5, 2008 in child U.S. Appl. No. 11/207,825 (now Patent No. 7350062).

U.S. Office Action mailed Jul. 6, 2007 in child U.S. Appl. No. 11/207,825 (now Patent No. 7350062).

U.S. Office Action mailed Feb. 12, 2007 in child U.S. Appl. No. 11/207,825 (now Patent No. 7350062).

U.S. Office Action mailed Aug. 23, 2006 in child U.S. Appl. No. 11/207,825 (now Patent No. 7350062).

U.S. Office Action (Notice of Allowance) mailed Dec. 19, 2007 in child U.S. Appl. No. 11/207,825 (now Patent No. 7350062).

* cited by examiner

FIG. 1B (1) BALR E, 4  | D | A | T | B | E | C | W |

(5) ST E, 80C(Q,F) | D | A | T | B | E | C | W |

(6) BCR F,E | D | A | T | B | E | C | W |
              | I | IT | IB | IR |
              (2) NOP 7   | D | A | T | B | E | C | W |

(3) BALR E, 4 | D | A | T | B | E | C | W |

(5) ST E, 80C(0,F) | D | A | T | B | E | C | W |

(6) BCR F,E | D | A | T | B | E | C | W |
              | I | IT | IB | IR |
              (4) NOP 8   | D | A | T | B | E | C | W |

LOSS OF 6τ

(1) RTN_ADRS_STK0_VAL=1　　　　　　　　　　　PUSH_RTN_ADRS_STACK=1
　　　RTN_ADRS_STK0_IAR_FF=INSTRUCTION ADDRESS OF NOP 1

(2) RTN_ADRS_STK1_VAL=1　　　　　　　　　　　PUSH_RTN_ADRS_STACK=1
　　　RTN_ADRS_STK1_IAR_FF=INSTRUCTION ADDRESS OF NOP 1
　　　RTN_ADRS_STK0_VAL=1
　　　RTN_ADRS_STK0_IAR_FF=INSTRUCTION ADDRESS OF NOP 3

(3) RTN_ADRS_STK2_VAL=1　　　　　　　　　　　PUSH_RTN_ADRS_STACK=1
　　　RTN_ADRS_STK2_IAR_FF=INSTRUCTION ADDRESS OF NOP 1
　　　RTN_ADRS_STK1_VAL=1
　　　RTN_ADRS_STK1_IAR_FF=INSTRUCTION ADDRESS OF NOP 3
　　　RTN_ADRS_STK0_VAL=1
　　　RTN_ADRS_STK0_IAR_FF=INSTRUCTION ADDRESS OF NOP 5

(4) RTN_ADRS_STK3_VAL=1　　　　　　　　　　　PUSH_RTN_ADRS_STACK=1
　　　RTN_ADRS_STK3_IAR_FF=INSTRUCTION ADDRESS OF NOP 1
　　　RTN_ADRS_STK2_VAL=1
　　　RTN_ADRS_STK2_IAR_FF=INSTRUCTION ADDRESS OF NOP 3
　　　RTN_ADRS_STK1_VAL=1
　　　RTN_ADRS_STK1_IAR_FF=INSTRUCTION ADDRESS OF NOP 5
　　　RTN_ADRS_STK0_VAL=1
　　　RTN_ADRS_STK0_IAR_FF=INSTRUCTION ADDRESS OF NOP 7

(5) RTN_ADRS_STK3_VAL=0　　　　　　　　　　　POP_RTN_ADRS_STACK=1
　　　RTN_ADRS_STK2_VAL=1
　　　RTN_ADRS_STK2_IAR_FF=INSTRUCTION ADDRESS OF NOP 1
　　　RTN_ADRS_STK1_VAL=1
　　　RTN_ADRS_STK1_IAR_FF=INSTRUCTION ADDRESS OF NOP 3
　　　RTN_ADRS_STK0_VAL=1
　　　RTN_ADRS_STK0_IAR_FF=INSTRUCTION ADDRESS OF NOP 5

(6) RTN_ADRS_STK3_VAL=1　　　　　　　　　　　PUSH_RTN_ADRS_STACK=1
　　　RTN_ADRS_STK3_IAR_FF=INSTRUCTION ADDRESS OF NOP 1
　　　RTN_ADRS_STK2_VAL=1
　　　RTN_ADRS_STK2_IAR_FF=INSTRUCTION ADDRESS OF NOP 3
　　　RTN_ADRS_STK1_VAL=1
　　　RTN_ADRS_STK1_IAR_FF=INSTRUCTION ADDRESS OF NOP 5
　　　RTN_ADRS_STK0_VAL=1
　　　RTN_ADRS_STK0_IAR_FF=INSTRUCTION ADDRESS OF NOP 8

FIG. 9

(7) RTN_ADRS_STK3_VAL=0     POP_RTN_ADRS_STACK=1
    RTN_ADRS_STK2_VAL=1
    RTN_ADRS_STK2_IAR_FF= INSTRUCTION ADDRESS OF NOP1
    RTN_ADRS_STK1_VAL=1
    RTN_ADRS_STK1_IAR_FF= INSTRUCTION ADDRESS OF NOP3
    RTN_ADRS_STK0_VAL=1
    RTN_ADRS_STK0_IAR_FF= INSTRUCTION ADDRESS OF NOP5

(8) RTN_ADRS_STK2_VAL=0     POP_RTN_ADRS_STACK=1
    RTN_ADRS_STK1_VAL=1
    RTN_ADRS_STK1_IAR_FF= INSTRUCTION ADDRESS OF NOP1
    RTN_ADRS_STK0_VAL=1
    RTN_ADRS_STK0_IAR_FF= INSTRUCTION ADDRESS OF NOP3

(9) RTN_ADRS_STK2_VAL=1     PUSH_RTN_ADRS_STACK=1
    RTN_ADRS_STK2_IAR_FF= INSTRUCTION ADDRESS OF NOP1     REPEATING(4) THROUTH (7) (NOP5→NOP6)
    RTN_ADRS_STK1_VAL=1
    RTN_ADRS_STK1_IAR_FF= INSTRUCTION ADDRESS OF NOP3
    RTN_ADRS_STK0_VAL=1
    RTN_ADRS_STK0_IAR_FF= INSTRUCTION ADDRESS OF NOP5

(10) RTN_ADRS_STK2_VAL=0    POP_RTN_ADRS_STACK=1
    RTN_ADRS_STK1_VAL=1
    RTN_ADRS_STK1_IAR_FF= INSTRUCTION ADDRESS OF NOP1
    RTN_ADRS_STK0_VAL=1
    RTN_ADRS_STK0_IAR_FF= INSTRUCTION ADDRESS OF NOP3

(11) RTN_ADRS_STK1_VAL=0    POP_RTN_ADRS_STACK=1
    RTN_ADRS_STK0_VAL=1
    RTN_ADRS_STK0_IAR_FF= INSTRUCTION ADDRESS OF NOP1

(12) RTN_ADRS_STK1_VAL=1    PUSH_RTN_ADRS_STACK=1
    RTN_ADRS_STK1_IAR_FF= INSTRUCTION ADDRESS OF NOP1    REPEATING(3) THROUTH(10)(NOP3→NOP4)
    RTN_ADRS_STK0_VAL=1
    RTN_ADRS_STK0_IAR_FF= INSTRUCTION ADDRESS OF NOP4

(13) RTN_ADRS_STK1_VAL=0    POP_RTN_ADRS_STACK=1
    RTN_ADRS_STK0_VAL=1
    RTN_ADRS_STK0_IAR_FF= INSTRUCTION ADDRESS OF NOP1

(14) RTN_ADRS_STK0_VAL=0    POP_RTN_ADRS_STACK=1

(15) RTN_ADRS_STK1_VAL=1    PUSH_RTN_ADRS_STACK=1
    RTN_ADRS_STK1_IAR_FF= INSTRUCTION ADDRESS OF NOP2    REPEATING(2) THROUTH(13)(NOP1→NOP2)

(16) RTN_ADRS_STK0_VAL=0    POP_RTN_ADRS_STACK=1

FIG. 10

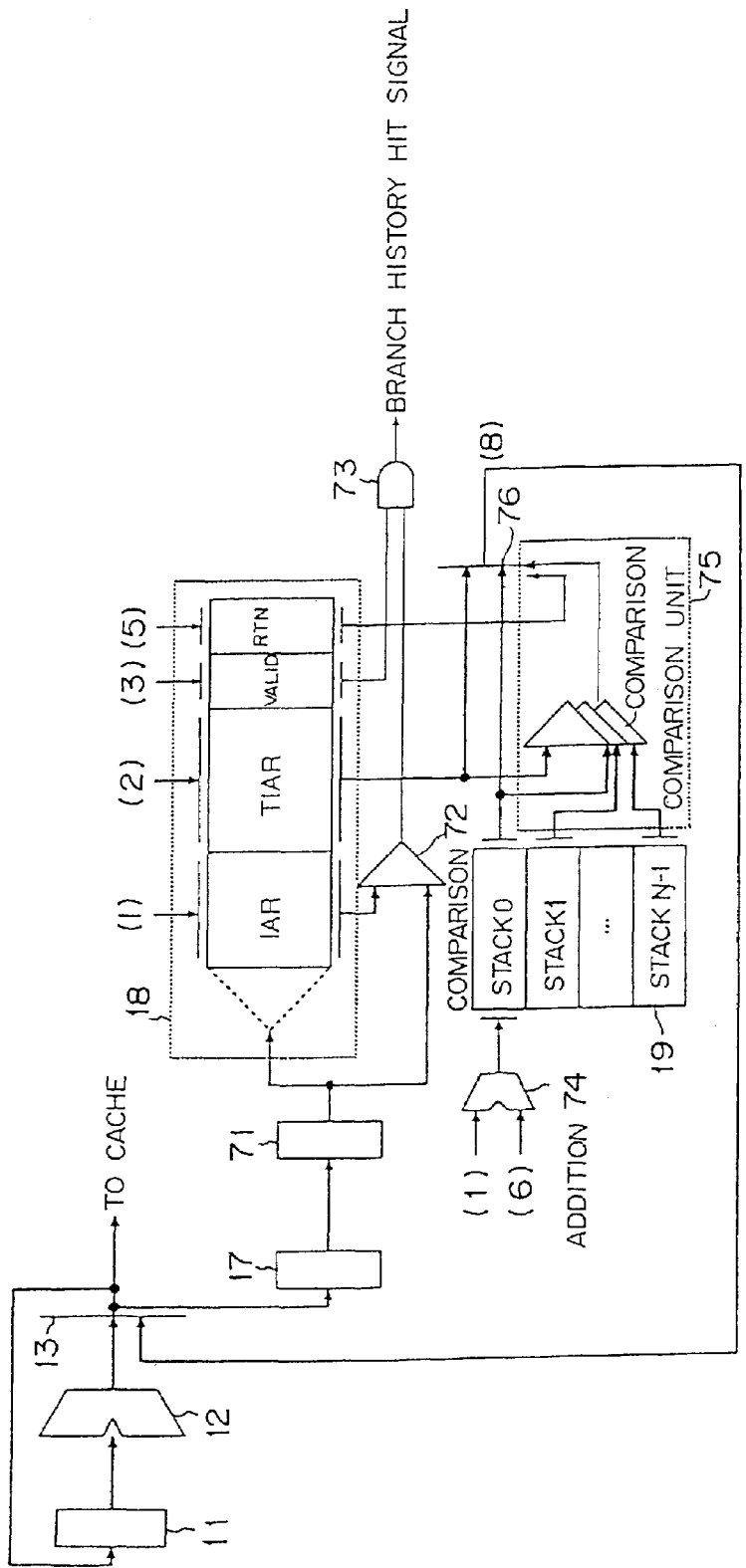

FIG. 12

11: INSTRUCTION ADDRESS REGISTER, 12: INSTRUCTION ADDRESS GENERATION CIRCUIT, 13, 76: SELECTORS, 17: BUFFER
18: BRANCH HISTORY, 19: RETURN ADDRESS STACK, 71: ADDRESS REGISTER
(1) INSTRUCTION ADDRESS OF COMPLETED BRANCH INSTRUCTION (2) BRANCHED-TO ADDRESS OF COMPLETED BRANCH INSTRUCTION
(3) SIGNAL INDICATING VALIDITY/INVALIDITY OF ENTRY
(5) SIGNAL INDICATING THAT COMPLETED INSTRUCTION IS SUBROUTINE RETURN INSTRUCTION
(6) INSTRUCTION LENGTH OF COMPLETED SUBROUTINE CALL INSTRUCTION (8) PREDICTED BRANCHED-TO ADDRESS (RETURN ADDRESS)

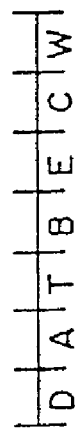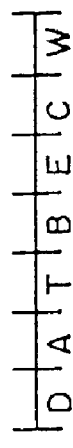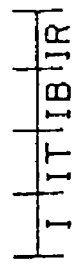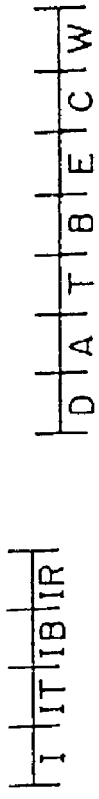
FIG. 18

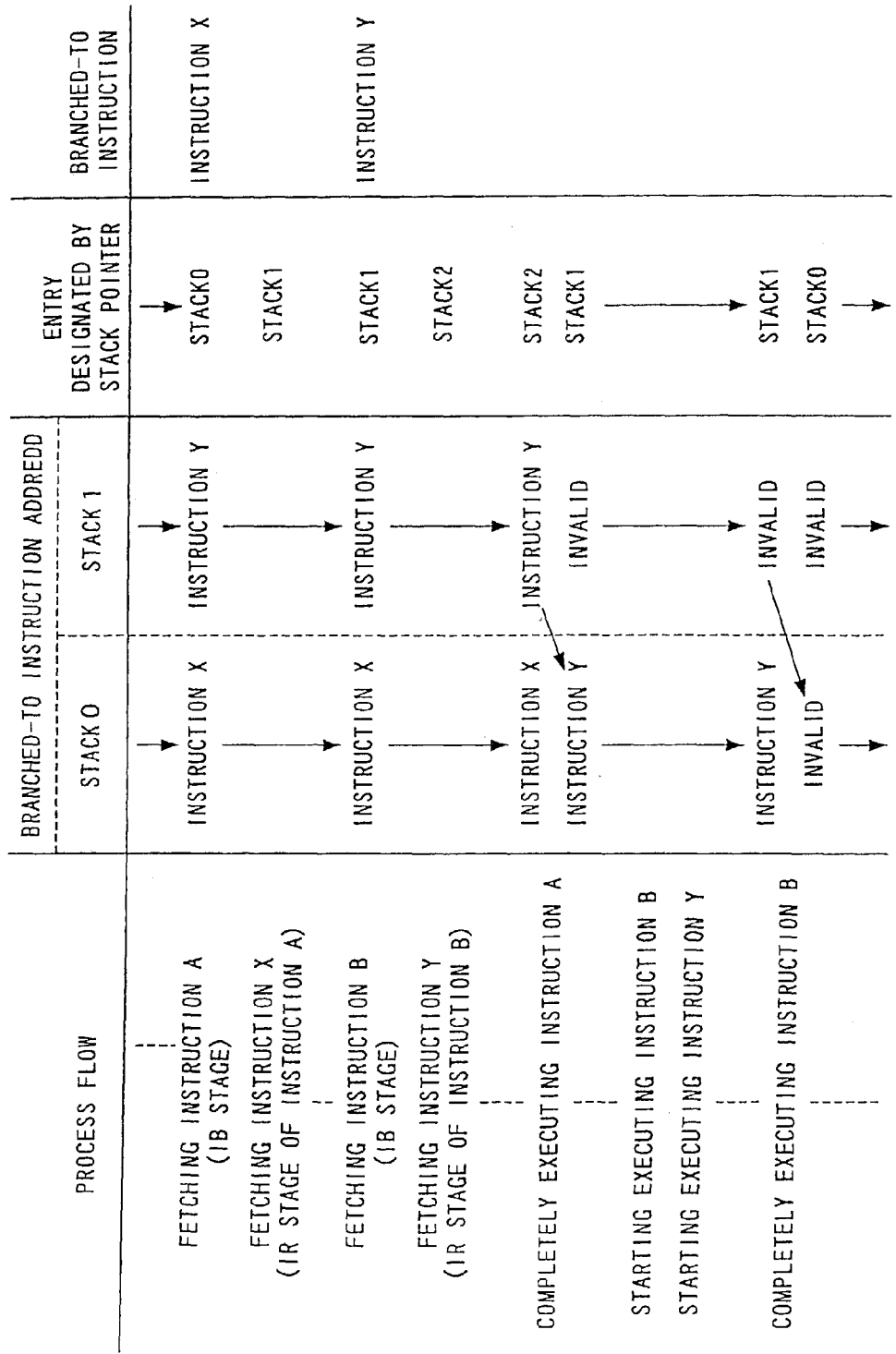
F I G. 23

RETURN TARGET ADDRESS PREDICTION BY MOVING ENTRY POINTER TO RETURN STACK POPPED AT COMPLETION TO DEEPER ONE AT RETURN INSTRUCTION FETCH

CROSS-REFERENCE TO RELATED APPLICATIONS

This application is a Divisional of application Ser. No. 09/456,523,filed Dec. 8, 1999, now issued U.S. Pat. No. 6,530,016.

BACKGROUND OF THE INVENTION

1. Field of the Invention

The present invention relates to an information processing device, especially a device in a pipeline processing system, super-scalar processing system, or an out-of-order-execution processing system, and more specifically to an instruction fetch control apparatus in an instruction processing device for use in quickly executing a sequence of instructions including a call instruction and a return instruction of a subroutine.

2. Description of the Related Art

In an instruction processing device in a pipeline processing system, a super-scalar processing system, or an out-of-order-execution processing system, the performance has been improved by sequentially inputting a subsequent sequence of instructions to a plurality of pipelines and starting the execution without waiting for the completion of the execution of one instruction. However, when an execution result of a preceding instruction has an influence of the execution of a subsequent instruction, the execution of the subsequent instruction cannot be started without waiting for the completion of the execution of the preceding instruction. Thus, the pipeline-stall causes the pipeline performance to be deteriorated. A typical example is a branch instruction.

Pipeline-stall operates because it is not certain whether or not a branch is taken, or because a branch instruction is not assigned the address of a branched-to instruction until the execution is completed. Therefore, a branch instruction has been developed such that it can be quickly processed using a branch history.

A branch history is used to execute a subsequent instruction or a branched-to instruction when a branch instruction is executed before it becomes certain whether or not a branch is taken.

When it becomes certain as a result of executing a branch instruction that a branch is taken, the address of a branched-to instruction and the address of the branch instruction itself are registered. When an instruction is fetched from the main storage before executing the instruction, it is indexed.

In addition, sequence of instructions is often executed in a subroutine. Assume that a subroutine is called from a main routine, and then control is returned from the subroutine to the main routine. This process is no other than executing a branch instruction. Considering a case in which control is returned from a subroutine to a main routine, an address of a branched-to instruction is changed as necessary in most cases.

FIG. 1A shows an example of a sequence of instructions containing a subroutine. In FIG. 1A, when control branches from an instruction (1) (branch instruction) in a main routine to, an instruction (5) in a subroutine, then branches from an instruction (6) (branch instruction) to an instruction (2) in the main routine, then branches from an instruction (3) (branch instruction) in the main routine to the instruction (5) in the subroutine, and then branches from the instruction (6) (branch instruction) to an instruction (4) in the main routine, a branched-to instruction of the instruction (6) is changed into the instruction (2) and the instruction (4) each time the instruction branches.

In the current branch history, if a branch has already been taken using a branch instruction, the instruction address of the branch instruction and the address of a branched-to instruction are registered together, and an instruction is fetched from the main storage and executed, then the instruction is fetched at the address of a branched-to instruction obtained as a result of indexing an instruction prior to the execution. At this time, when the address of a branched-to instruction of a branch instruction is changed for any factor, it is obvious that the address of the branched-to instruction obtained as a result of indexing the branch history is nullified. Therefore, the process being performed is canceled, and an instruction is fetched again at an address of a correct branched-to instruction.

If the above described phenomena repeatedly appear, the address of a branched-to instruction changes although the same branch instruction is executed. As a result, even if an instruction is fetched at the address of a branched-to instruction obtained as a result of indexing a branch history, the address of a branched-to instruction is nullified, the process being performed is canceled, and an instruction should be fetched again at the address of a correct branched-to instruction.

In FIG. 1A, when control first branches from the instruction (6) (branch instruction) to the instruction (2), the instruction address of the instruction (6) and the instruction address of a branched-to instruction (instruction (2)) are registered together. On the other hand, when the instruction (6) appears in the sequence of instructions again, the instruction (2) can be passed to an instruction fetch pipeline without a loss by indexing a branch history because the instruction address of the instruction (6) and the instruction address of a branched-to instruction (instruction (2)) are registered together. However, since the branched-to instruction from the instruction (6) is actually the instruction (4), the process is canceled halfway, and an instruction is fetched at the address of a correct instruction (4). As a result, a loss of 6-c is detected from the execution of the instruction (6) to the execution of the instruction (4). FIG. 1B shows an example of such an operation.

As described above, if a branch is taken using a branch history, a combination of an address of a branch instruction and an instruction address is registered in the branch history, and a branch instruction having the same address appears in a sequence of instructions, then the branched-to sequence of instructions can be executed using the registered instruction address as a predicted instruction address, thereby performing a process at a higher speed. However, when the address of a branched-to instruction changes, an execution result becomes invalid if an instruction is fetched using the address of a branched-to instruction obtained as a result of searching the branch history. Therefore, an instruction should be fetched again using a correct branched-to address. As a result, there arises the problem that the branch history cannot be made the most of.

SUMMARY OF THE INVENTION

The present invention aims at processing a branch instruction, especially a sequence of instructions containing a subroutine at a high speed using a return address stack storing a return address corresponding to a call instruction of a subroutine.

According to an aspect of an invention, an instruction fetch control apparatus includes an instruction completion notifier, and an entry designation unit predicting a return address of a subroutine during an instruction fetching, wherein the entry designation unit computes a designate entry position in a return address stack by changing the designate entry to indicate a one-step shallower entry when a call instruction is predicted during the instruction fetching, changing the designate entry independently of a push or pop operation to indicate a one-step deeper entry when a return instruction is predicted during an instruction fetching, and changing the designate entry depending upon a push and pop operation when a call and return instruction is completed, thereby keeping a position of the designate entry, and wherein the entry designation unit designates an entry as a predicted return address of a subroutine when the fetched instruction hits in a branch history and determined as a return instruction.

According to the second aspect of the present invention, the instruction fetch control apparatus is designed to have an entry designation unit. When an instruction which has been fetched from the main storage device and has been detected as a hit in the branch history is a return instruction of a subroutine, the entry designation unit designates an entry in a plurality of entries in the return address stack as an entry storing the return address of the return instruction.

BRIEF DESCRIPTION OF THE DRAWINGS

FIG. 1B shows the operation performed when the sequence of instructions shown in FIG. 1A is processed;

FIG. 9 is a view (1) showing the contents of the return address stack and the value of a valid signal when the sequence of instructions shown in FIG. 8 is executed;

FIG. 10 is a view (2) showing the contents of the return address stack and the value of a valid signal when the sequence of instructions shown in FIG. 8 is executed;

FIG. 12 is a block diagram of the detailed configuration according to the first embodiment of the present invention;

FIG. 18 shows the process performed on the sequence of instructions shown in FIG. 16;

FIG. 23 shows an example of an operation of the stack pointer for the execution of a sequence of instructions described in FIG. 16, and the return address stack;

DETAILED DESCRIPTION OF THE PREFERRED EMBODIMENTS

The embodiment of the present invention is described below in detail by referring to the attached drawings.

Figure 2A:
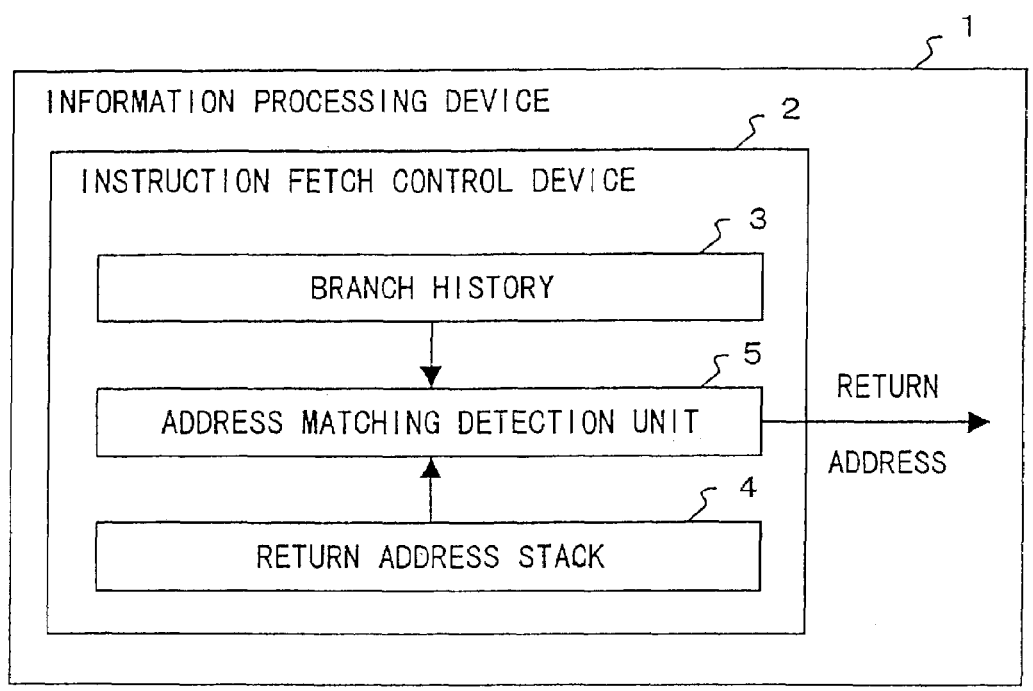
FIG. 2A is a block diagram of the configuration of the principle according to the first embodiment of the present invention.

FIG. 2A is a block diagram of the configuration of the principle of the information processing device according to the first embodiment of the present invention described later. In FIG. 2A, an instruction fetch control device 2 is provided in an information processing device 1. The instruction fetch control device 2 comprises: a branch history 3 in which an instruction address of a branch instruction and the address of a branched-to instruction used when a branch is taken are registered as a set of data; and a return address stack 4 storing, when a call instruction of a subroutine is completed, an instruction address to which a subroutine is returned.

In FIG. 2A, when an instruction which has been fetched from the main storage device and has been detected as a hit in the branch history 3, that is, the instruction whose instruction address has already been registered in the branch history, is a return instruction of a subroutine, an address matching detection unit 5 compares the address of a branched-to instruction registered in the branch history 3 with all return addresses stored in the valid entries in the return address stack, and transmits a matching address as a return address of the return instruction to an instruction fetch unit for fetching an instruction.

According to the first embodiment of the present invention, when the address of a branched-to instruction already registered in the branch history 3 does not match any of the return addresses stored in the valid entries in the return address stack 4, the address matching detection unit 5 can provides the instruction address stored in the leading entry for the instruction fetch unit as a returned-to address of the subroutine.

In addition, according to the first embodiment of the present invention when a branch instruction is a return instruction of a subroutine, the branch history 3 further includes a return flag storage area storing in addition to the set of data a flag indicating a return instruction so that the address matching detection unit 5 can recognize that the instruction fetched from the main storage device is a return instruction of a subroutine according to the contents of the return flag storage area.

Figure 2B:
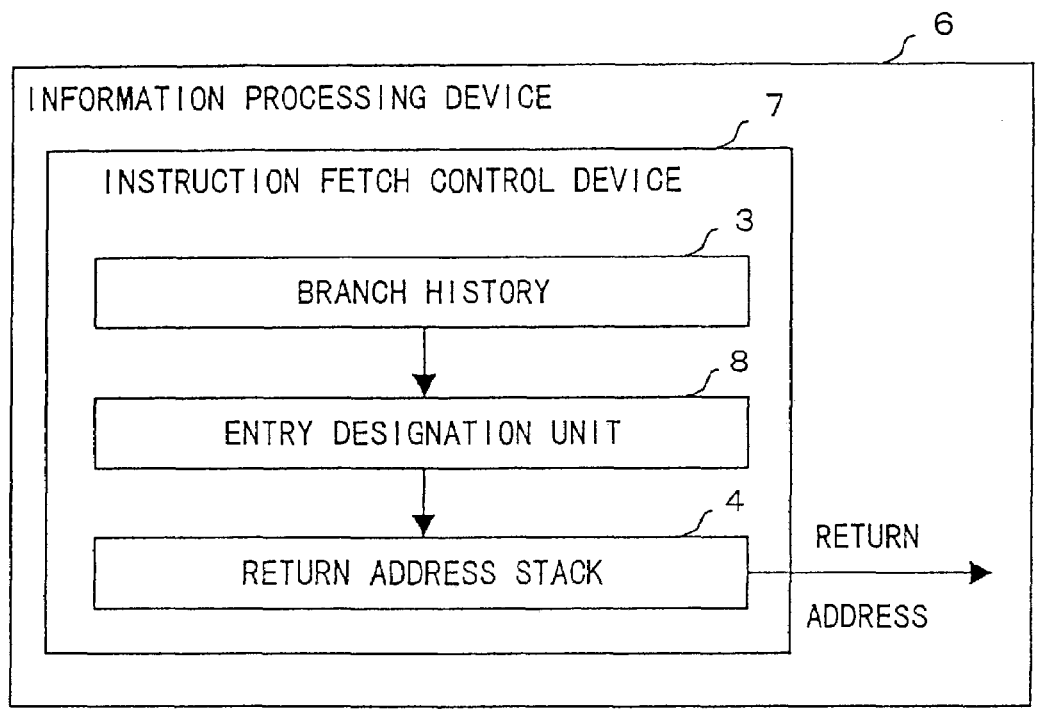
FIG. 2B is a block diagram of the configuration of the principle according to the second embodiment of the present invention.

Furthermore, according to the first embodiment of the present invention, the return address stack 4 can also include plural stages of entries for storing a plurality of addresses of returned-to instructions of a subroutine, and a plurality of significant bit storage areas indicating the validity of each entry. The return address stored in each entry of the return address stack 4 is pushed when a subroutine call instruction is completely executed, the leading entry of the return address stack 4 can store the address of a returned-to instruction of the subroutine, and the return address stored in each entry of the return address stack 4 can be popped when the return instruction of the subroutine is completely executed. FIG. 2B is a block diagram of the configuration of the principle of an information processing device 6 according to the second embodiment of the present invention. In FIG. 2B, the information processing device 6 comprises an instruction fetch control device 7 of the present invention, and the instruction fetch control device 7 comprises the branch history 3 and the return address stack 4.

In FIG. 2B, when an instruction which has been fetched from the main storage device and has been 15 detected as a hit in the branch history 3 is a return instruction of a subroutine, the entry designation unit 8 designates an entry in a plurality of entries in the return address stack 4 as an entry storing the return address of the return instruction. The instruction is fetched using the address stored in the designated entry.

In FIG. 2B, as in FIG. 2A, the branch history 3 further includes a return flag storage area, and, as the address matching detection unit 5 shown in FIG. 2A, the address matching detection unit 5 can also recognize the instruction fetched from the main storage device as a return instruction of a subroutine according to the contents of the return flag storage area.

In the second embodiment, when it is recognized according to the contents of the return flag storage area that the branch instruction fetched from the main storage device and detected as a hit in the branch history 3 is a return instruction of a subroutine, the address matching detection unit 5 can increase the number of the designated entry number by 1 prior to the execution of the branch instruction, and the entry designation unit 8 can decrease the designated number by 1 when the return instruction of the subroutine is completely executed.

Furthermore, according to the second embodiment, a branch history further includes a call flag storage area storing in addition to a set of data a flag indicating a call instruction when a branch instruction is a call instruction of a subroutine. When it is recognized according to the contents of the call flag storage area that the instruction fetched from the main storage device is a call instruction of a subroutine, the address matching detection unit 8 can decrease the number of the designated entry number by 1 prior to the execution of the branch instruction, and the entry designation unit 8 can increase the designated number by 1 when the return instruction of the subroutine is completely executed.

In addition, according to the second embodiment of the present invention, when the entry designation unit 8 designates an invalid entry in the return address stack 4, an instruction can be fetched using a branched-to address stored in the branch history 3.

Finally, according to the second embodiment, as in the first embodiment, the return address stack 4 can also include plural stages of entries for storing a plurality of addresses of returned-to instructions of a subroutine, and a plurality of significant bit storage areas indicating the validity of each entry. The return address stored in each entry can be pushed when a subroutine call instruction is completely executed, and the return address stored in each entry can be popped when the return instruction of the subroutine is completely executed.

As described above, according to the present invention, an instruction is fetched using a return address matching the branched-to address stored in the branch history among a plurality of return addresses stored in the return address stack according to the first embodiment. According to the second embodiment, an instruction is fetched using a return address stored in the entry designated by the entry designation unit in the return address stack.

Figure 3:
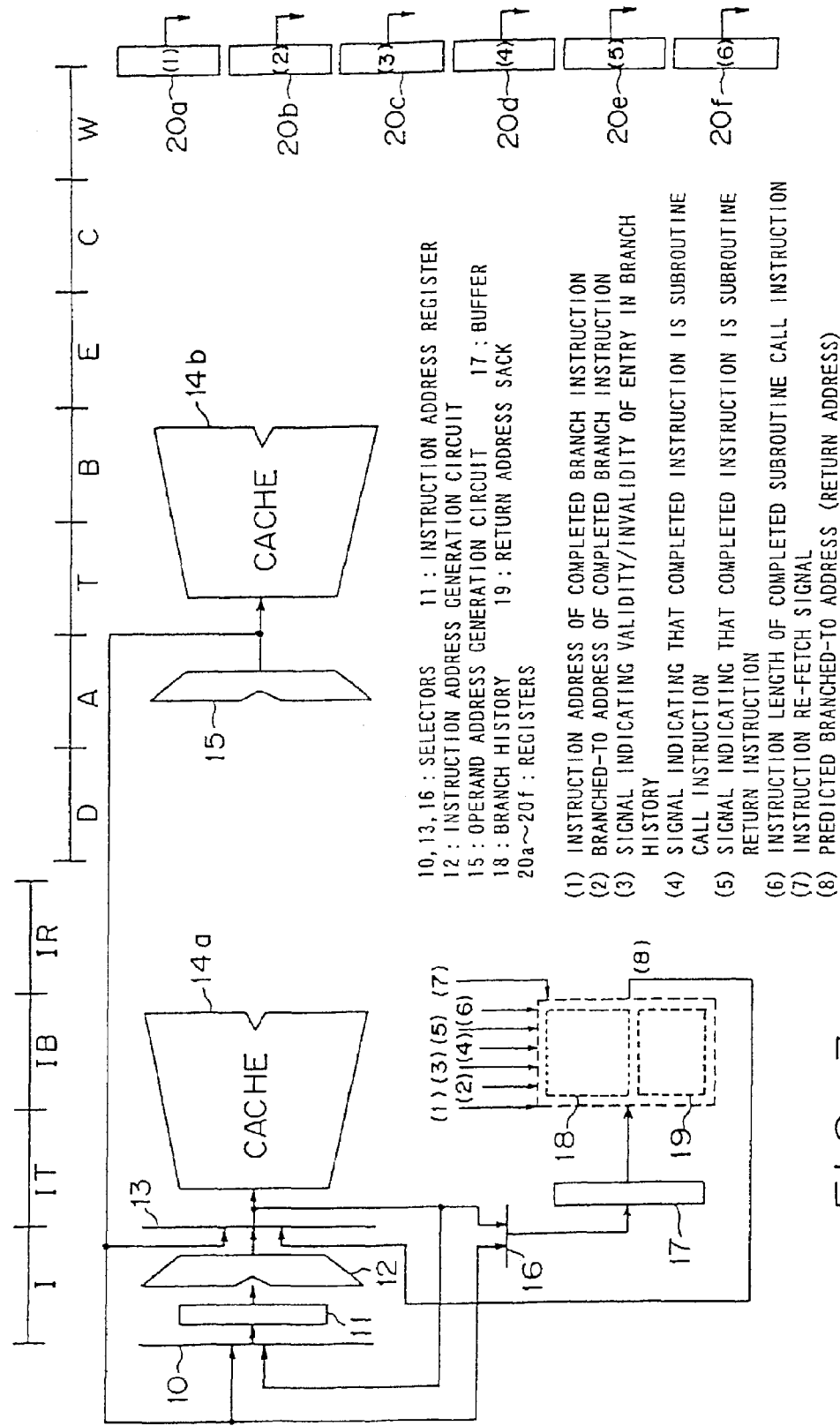
FIG. 3 is a block diagram of the entire configuration of the information processing device to which the instruction fetch control apparatus according to the present-invention is applied.

FIG. 3 is a block diagram of the configuration of the information processing device having the instruction fetch control apparatus according to the present invention. FIG. 3 shows only the units directly related to the present invention.

In the information processing device shown in FIG. 3, the processes of pipelines for use in fetching an instruction, and in executing an instruction are performed as pipeline operations. First, a pipeline for fetching an instruction comprises an instruction fetch request issue cycle I, a tag and TLB access cycle IT, a buffer access cycle IB, and a result output cycle IR. A pipeline for executing an instruction comprises an instruction decode cycle D, an address computation cycle A, an address conversion cycle T, a buffer access cycle B, an execution cycle E, a check cycle C, and a result write cycle W.

The present invention mainly relates to a process of pipelines for use in fetching an instruction. The components for performing this process are a selector 10, an instruction address register 11, an instruction address generation circuit 12, a selector 13, a cache 14a, a selector 16, a buffer 17 temporarily storing an instruction address, a branch history 18, and a return address stack 19.

Since the units for performing the pipeline operation for executing an instruction are not directly related to the present invention, only an operand address generation circuit 15 and a cache 14b are shown in FIG. 3. From the cache 14a for use in fetching an instruction to the operand address generation circuit 15, an instruction can be processed in a plurality of instruction control circuits such as an instruction decode circuit, and so on, while it may be unnecessary for an instruction to generate an operand address. Therefore, it is not correct to directly connect them by a solid line. In addition, all circuits existing between them are omitted here because they are not directly related to the present invention.

An output from the operand address generation circuit 15, that is, an address actually computed for a result of decoding an instruction, or an output from the selector 13 is provided for the selector 10. The output from the selector 13 can be an output from the operand address generation circuit 15, a branch prediction address output from the branch history 18 as described later, an output from the instruction address generation circuit 12, and so on.

For example, when an instruction is not a branch instruction, the next instruction to be fetched is a sequence of instructions immediately after the current instruction, and an output of the instruction address generation circuit 12 should be fed back to compute the instruction address. When a branch is predicted, the predicted branched-to address should be provided for the instruction address register 11.

An output from the selector 16 is output from either the selector 13 or the operand address generation circuit 15. The output is selected, temporarily stored in the buffer 17, and then provided for the branch history 18 or the return address stack 19. For the branch history 18 or the return address stack 19, an instruction address (1) of a completed branch instruction, a branched-to address (2) of a completed branch instruction, a signal (3) indicating that each entry in a branch history is valid/invalid, a signal (4) indicating that the completed instruction is a subroutine call instruction, a signal (5) indicating that the completed instruction is a subroutine return instruction, the length (6) of the completed subroutine call instruction, a signal (7) for use in re-fetching an instruction are provided. From the branch history 18 or the return address stack 19, a predicted branched-to address (return address) (8) is output. The operations of the branch history 18 and the return address stack 19 are described later.

Before describing in detail the embodiment of the present invention, the basic configuration and an example of the operation of a return address stack are described first.

Figure 4:
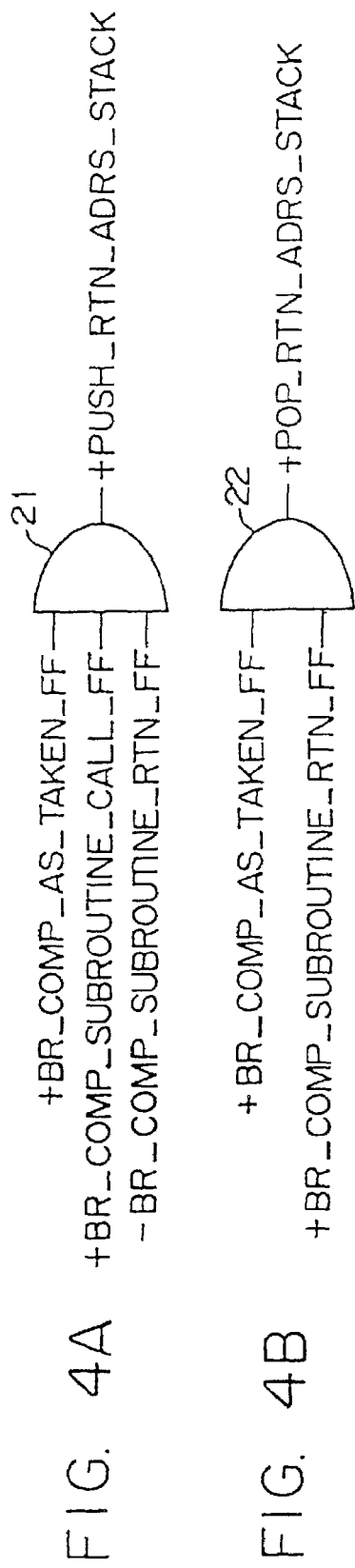
FIG. 4A shows the configuration of a push signal generation circuit for a return address stack.
FIG. 4B shows the configuration of a pop signal generation circuit for a return address stack.

FIG. 4A shows the control signal generation circuit for a pushing operation of a return address stack. FIG. 4B shows the control signal generation circuit for a popping operation of a return address stack.

FIG. 4A shows the output circuit of a push signal. When a signal (BR_COMP_AS_TAKEN_FF) indicating that a branch indicated by a branch instruction (BR) is taken, that is, 'taken', shows an H level, a signal (BR_COMP_SUBROUTINE_CALL_FF) indicating that the completed branch instruction is an instruction corresponding to a call of a subroutine indicates the H level, a signal (BR_COMP_SUBROUTINE_RETURN_FF) indicating that the completed branch instruction is an instruction corresponding to a return of a subroutine indicates an L level, a push signal for the return address stack is output from an AND gate 21.

FIG. 4B shows the output circuit of a pop signal for the return address stack. In FIG. 4B, a pop signal is output when the signal indicating that a branch instruction is taken as an input to an AND gate 22, and the signal indicating that the branch instruction is a subroutine both indicate the H level.

Figure 5:
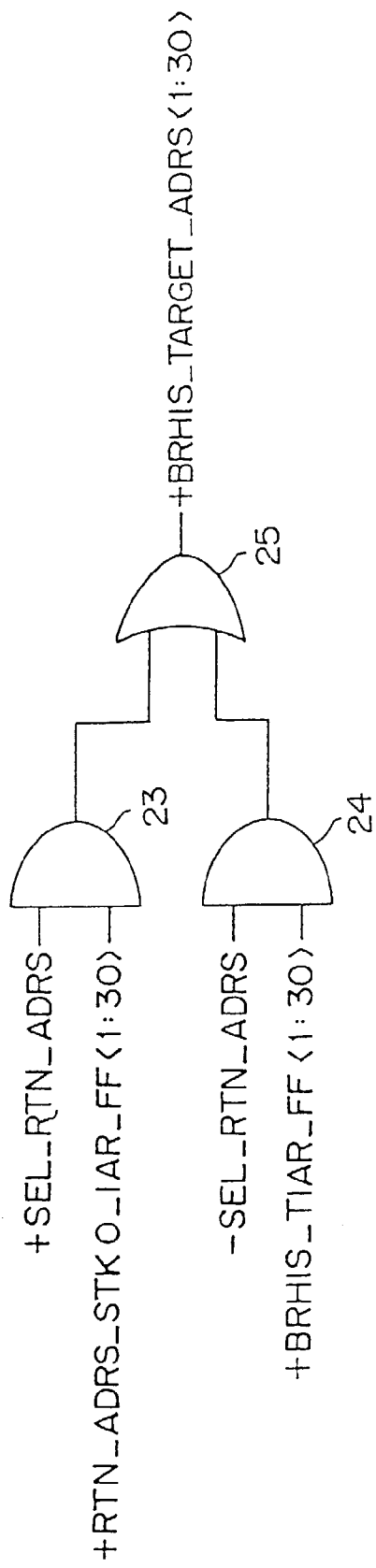
FIG. 5 is a block diagram of the configuration of a predicted branched-to address (return address) output circuit.

FIG. 5 shows the configuration of the circuit for selecting either the branched-to address registered in the branch history 18 shown in FIG. 3 or the return address stored in the return address stack 19, and 22 outputting the selected address as a predicted branched-to address (return address, BRHIS_TARGET_ADRS) (8). In FIG. 5, when the return address selection signal (SEL_RTN_ADRS) input to an AND gate 23 indicates the H level, the 30-bit instruction address IAR stored in the leading entry (STACK0) is output as a branch history target address, that is, a 30-bit predicted branched-to address (return address) (8) through an OR gate 25. On the other hand, when the return address stack selection signal indicates the L level, a 30-bit target instruction address TIAR stored in the branch history 18 is output as a branch history target address from an AND gate 24 through the OR gate 25.

FIGS. 6A, 6B, 6C, 6D, 7A, 7B, 7C, and 7D show the operations of the return address stack. Normally, a return address stack comprises plural stages of stacks (entries) each of which stores a plurality of return addresses, and plural stages of latches for outputting a valid signal corresponding to each stage of stack. FIGS. 6A, 6B, 6C, and 6D show plural stacks (four stages of latches in this example) outputting a valid signal for each stage.

Figure 6A:
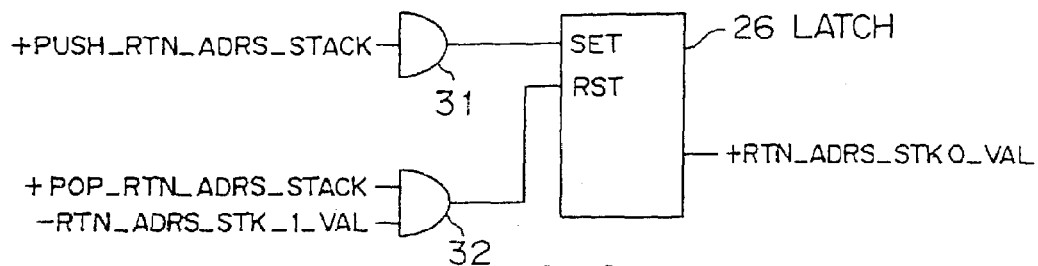
FIG. 6A is a block diagram (1) of the configuration of the valid signal output circuit of the return address stack.

In FIG. 6A, if a push signal is input as an output from the AND gate 21 shown in FIG. 4A to the set terminal of a latch 26 for outputting a valid signal for the leading entry of the return address stack, that is, the STACK0, through an AND gate 31, then an output from the latch 26, that is, a valid signal for the STACK0 indicates the H level.

Figure 6B:
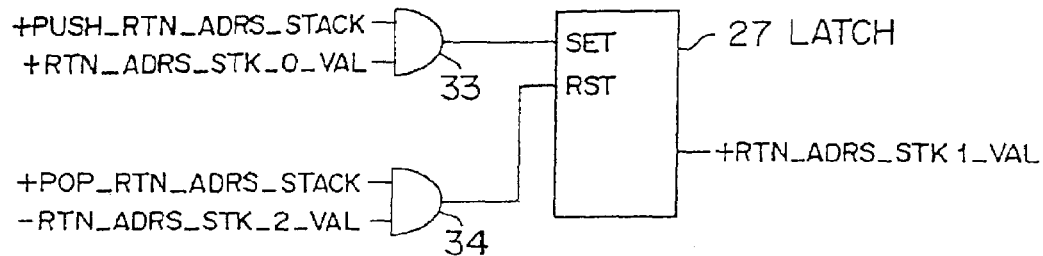
FIG. 6B is a block diagram (2) of the configuration of the valid signal output circuit of the return address stack.

In FIG. 6B, if a push signal and a valid signal for the STACK0 as the leading entry of the return address stack, that is, the output from the latch 26 shown in FIG. 6A are input as H level signals to an AND gate 33 connected to the set terminal of a latch 27, then the output from the AND gate 33 indicates the H level, and the valid signal for the next entry, that is, the STACK1, in the return address stack indicates the H level.

Figure 6C:
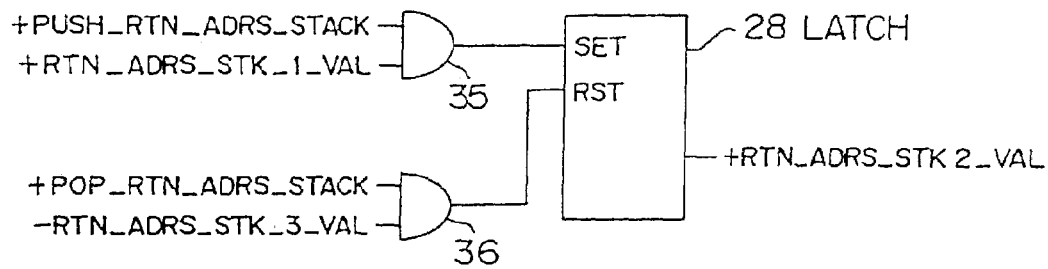
FIG. 6C is a block diagram (3) of the configuration of the valid signal output circuit of the return address stack.

When the push signal indicates the push signal and is input to an AND gate 35 together with the valid signal for the STACK1, an output from a latch 28 shown in FIG. 6C, that is, the valid signal for the STACK2 indicates the H level.

Figure 6D:
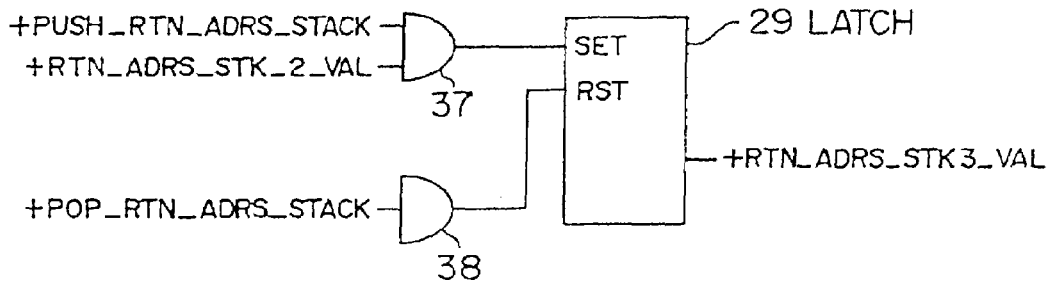
FIG. 6D is a block diagram (4) of the configuration of the valid signal output circuit of the return address stack.

Similarly, when the next push signal is input, the output from an AND gate 37 makes the output from a latch 29 shown in FIG. 6D, that is, the valid signal for the STACK3,indicates the H level.

Described below is the control of a valid signal using a pop signal.

In FIG. 6D, when a pop signal output from the AND gate 22 shown in FIG. 4B is input to an AND gate (same as a simple buffer) 38, the latch 29 is reset and the valid signal for the STACK3 indicates the L level.

If a pop signal is input to an AND gate 36 as shown in FIG. 6C, and the valid signal for the STACK3 indicates the L level, the latch 28 is reset, and the valid signal for the STACK2 indicates the L level. As described above, the latch 29 shown in FIG. 6D is reset by a pop signal. However, although the valid signal for the STACK3 output from the latch 29 shown in FIG. 6D is originally indicates the L level, the latch 28 is reset by a pop signal as described above, and the valid signal for the STACK2 indicates the L level.

Similarly, in FIGS. 6B and 6A, the latches 27 and 26 are reset, and the valid signals output from them indicate the L level.

FIGS. 7A, 7B, 7C, and 7D shows the operations of storing return addresses for plural stages of stacks (entries) for storing return addresses as the central portions of the return address stack.

Figure 7A:
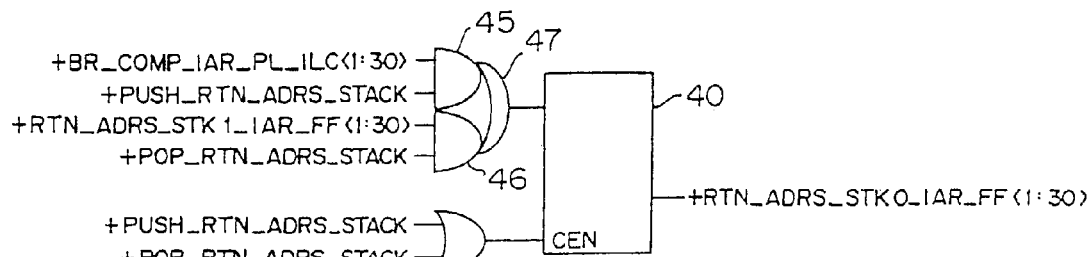
FIG. 7A is a view (1) showing the return address storing operation for plural stages of stacks of the return address stack.

In FIG. 7A, a latch 40 storing an instruction address IAR as a return address, as the leading entry (STACK0) shown in FIG. 7A, latches data when a push signal is input to an OR gate 48, and the output from the OR gate 48 is provided for the chip enable (CEN) terminal. When the push signal is input, a sum of the instruction address IAR of a branch instruction and an instruction length ILC, which is provided for another input terminal of an AND gate 45, is latched through an OR gate 47, and can be output as an IAR stored in the return address stack (STACK0).

Figure 7B:
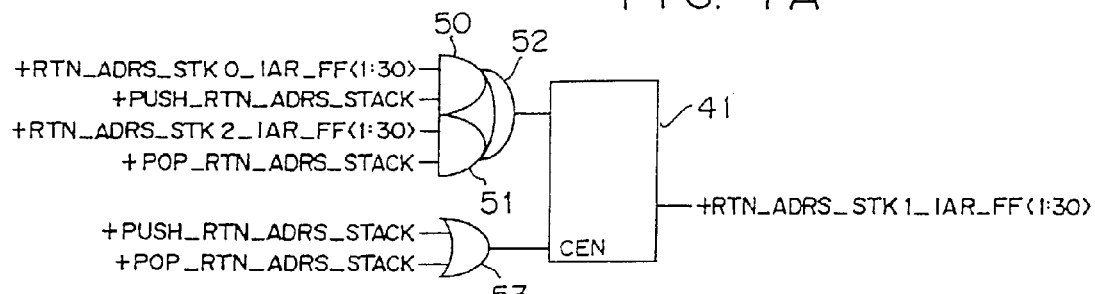
FIG. 7B is a view (2) showing the return address storing operation for plural stages of stacks of the return address stack.

When the next push signal is provided for an OR gate 53 in FIG. 7B, a latch 41 enters a chip enable state, and the IAR of the return address stack (STACK0), that is, the output from the latch 40 shown in FIG. 7A, to be provided for an AND gate 50 together with a push signal is latched by the latch 41 through an OR gate 52, and the output is the IAR of the return address stack (STACK)I.

Figure 7C:
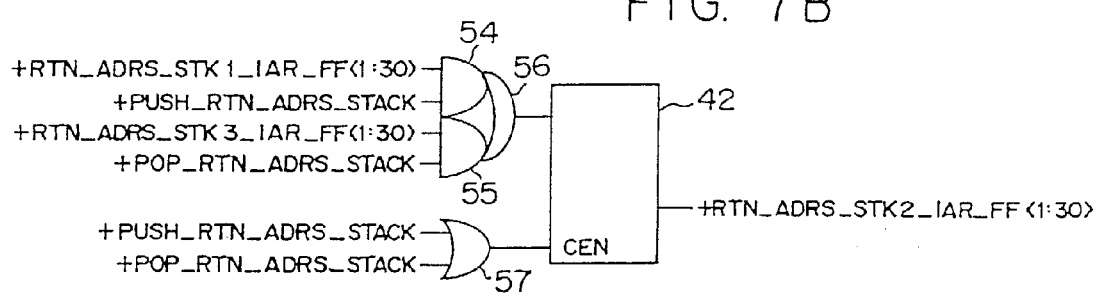
FIG. 7C is a view (3) showing the return address storing operation for plural stages of stacks of the return address stack.
Figure 7D:
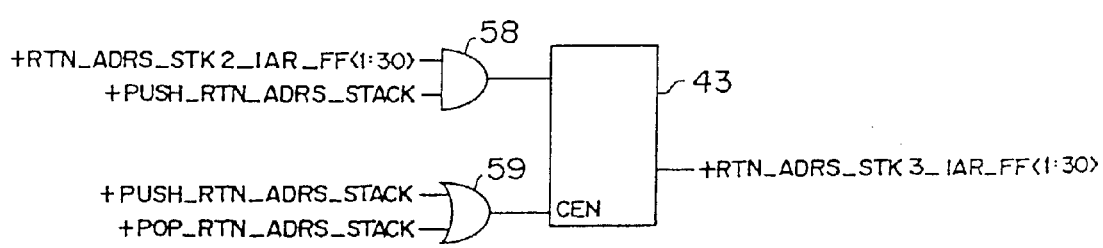
FIG. 7D is a view (4) showing the return address storing operation for plural stages of stacks of the return address stack.

Similarly, each time a push signal is input, an output from the latch 41 shown in FIG. 7B is latched by a latch 42 shown in FIG. 7C, and an output from the latch 42 is latched by a latch 43 shown in FIG. 7D.

The popping operation of a stack is described below.

In FIG. 7C, a pop signal output from the AND gate 22 is input to the chip enable terminal of the latch 42 thorough an OR gate 57. At this time, a pop signal is input to one input terminal of an AND gate 55, and the IAR of the STACK3 output from the latch 43 shown in FIG. 7D is latched in the latch 42. At this time, the IAR of the return address stack (STACK2) output from the latch 42 is provided for an AND gate 51 shown in FIG. 7B, and the IAR of the STACK2 is latched in the latch 41 through the OR gate 52 shown in FIG. 7B.

Similarly, the IAR of the return address stack (STACK2) output from the latch 41 shown in FIG. 7B is latched in the latch 40 shown in FIG. 7A.

Normally, the leading entry in plural stages of a return address stack, that is, the instruction address of the STACK0, is output from the AND gate 23 shown in FIG. 5. That is, in the plural stages of return address stack, the first stored return address of a subroutine call is fetched last, and the last stored return address of the subroutine call is fetched first.

An example of an operation of the return address stack is described below by referring to FIGS. 8, 9, and 10.

Figure 8:
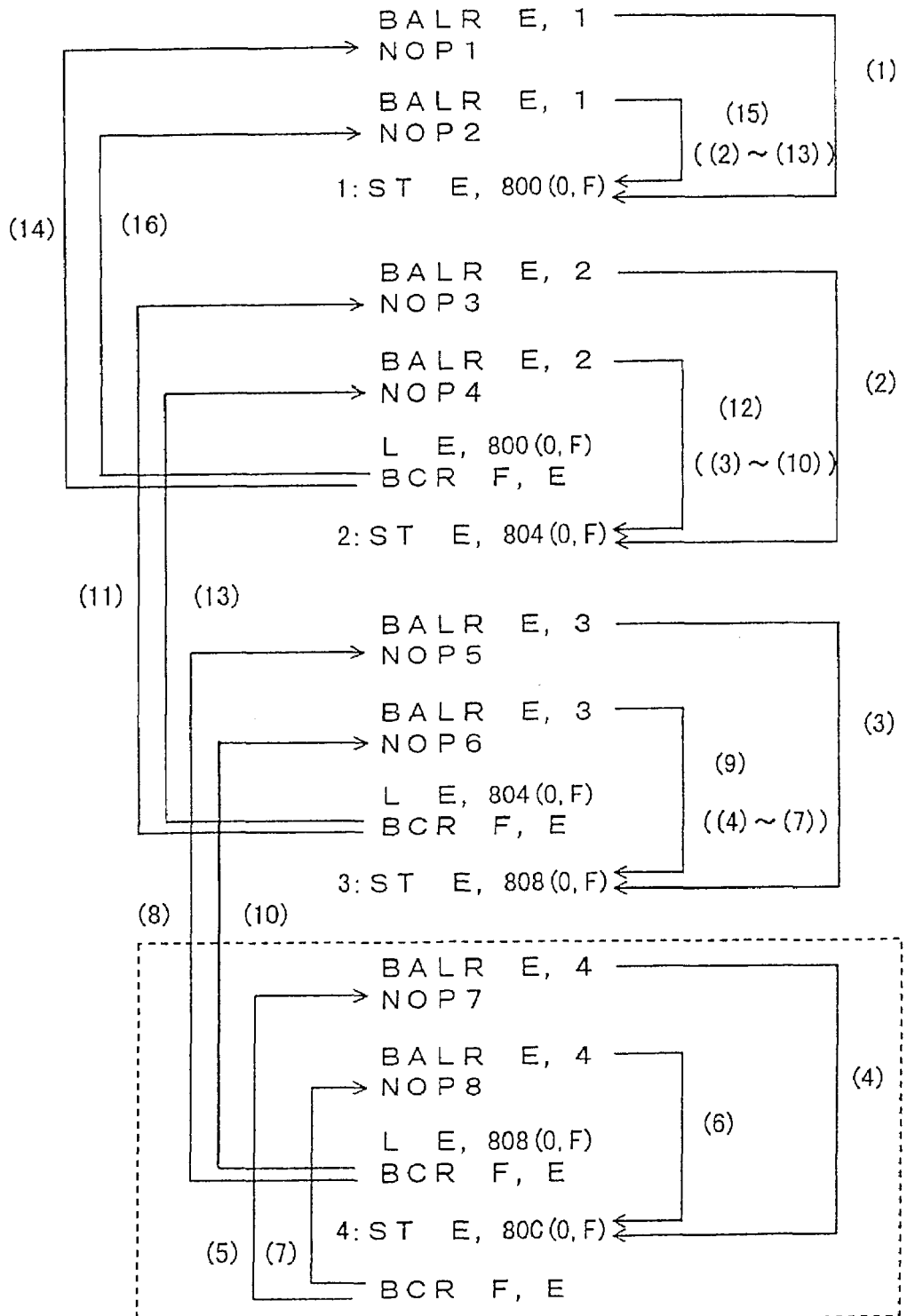
FIG. 8 shows an example of a sequence of instructions containing four types of subroutines.

FIG. 8 shows an example of a sequence of instructions in which four types of subroutines are used. FIGS. 9 and 10 show the contents of each stage of the return address stack when the sequence of instructions is executed, and a value of a valid signal.

In FIG. 8, when the BALK instruction (1) which is the first branch instruction is executed, a subroutine call instruction is executed, and a push signal output from the AND gate 21 shown in FIG. 4A indicates the H level. As a result, the output from the latch 26 indicates the H level, and the instruction address of the NOP1, which is a returned-to instruction of the subroutine call instruction is latched in the latch 40 shown in FIG. 7A.

When the next BALK instruction (2) is executed, the push signal turns indicates the H level again, and the instruction address of the NOP1 stored in the latch 40 in FIG. 7A is latched in the latch 41 shown in FIG. 7B. Then, the latch 40 stores the instruction address of the NOP3 as a returned-to instruction of the subroutine call instruction.

Similarly, the branch instructions (subroutine call instructions) (3) and (4) are executed, the instruction address of the NOP7 is latched in-the latch 40 shown in FIG. 7A, the instruction address of the NOP5 is latched in the latch 41 shown in FIG. 7B, the instruction address of the NOP3 is latched in the latch 42 shown in FIG. 7C, and the instruction address of the NOP1 is latched in the latch 43 shown in FIG. 7D.

Then, the branch instruction (5), that is, the subroutine return instruction, is executed, and the output from the AND gate 22 shown in FIG. 4B, that is, the pop signal, indicates the H level. Then, the output from the latch 29 shown in FIG. 6D, that is, the valid signal for the STACK3, indicates the L level, the contents of the latch 43 shown in FIG. 7D are popped in the latch 42, the contents of the latch 42 shown in FIG. 7C are popped in the latch 41 shown in FIG. 7B, and the contents of the latch 41 shown in FIG. 7B are popped in the latch 40 shown in FIG. 7A. As a result, the instruction address of the NOP7, which is a returned-to instruction of the subroutine return instruction (5), is fetched from a return address stack, and then disappears.

When the instruction (6) is executed, the instruction address of the NOP8 is set in the STACK0 as the address of a returned-to instruction of a subroutine call instruction, and a pushing operation of a stack is performed. When the instruction (7), that is, a subroutine return instruction, is executed, the instruction address of the NOP8 which is a correct returned-to instruction is stored in the leading entry of the return address stack, thereby correctly executing the branch instruction.

Figure 1A:
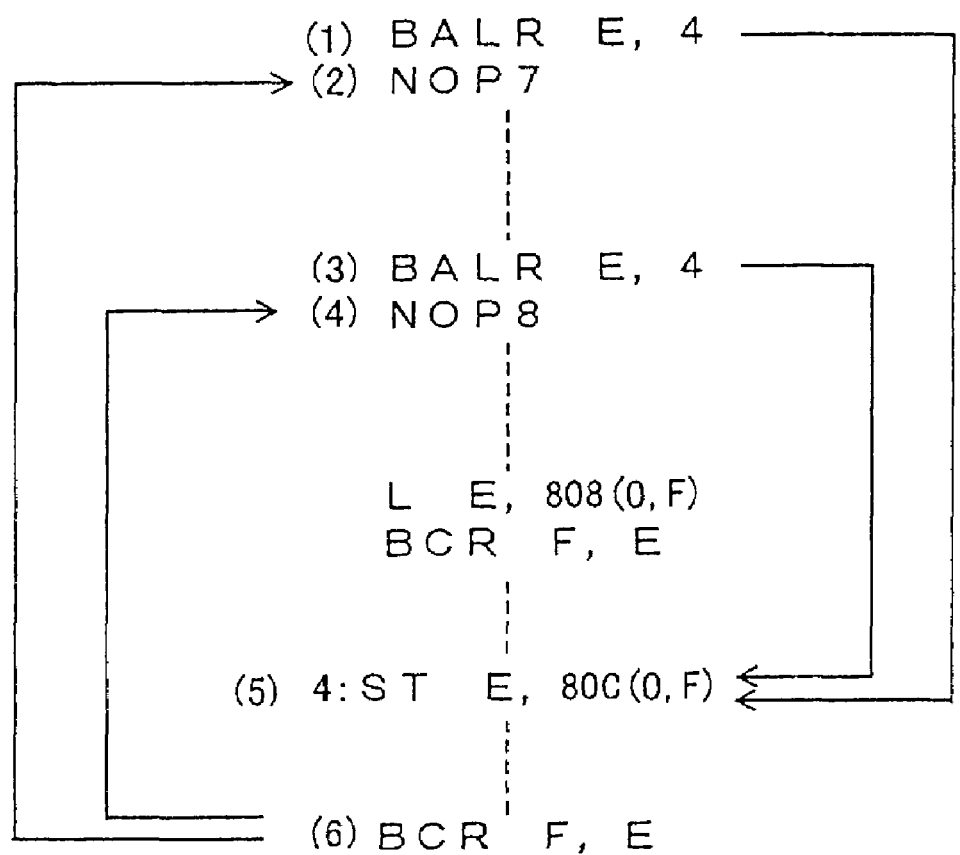
FIG. 1A shows an example of a sequence of instructions containing a subroutine.

The sequence of instructions containing the instructions (4) through (7) is the same as those described above by referring to the conventional technology shown in FIG. 1A. By processing the same sequence of instructions using the contents stored in the return address stack, the present invention can solve the problem that the instruction (4) should be re-fetched when control is returned from the instruction (6) to the instruction (4) as shown in FIG. 1A according to the conventional technology.

Figure 11:
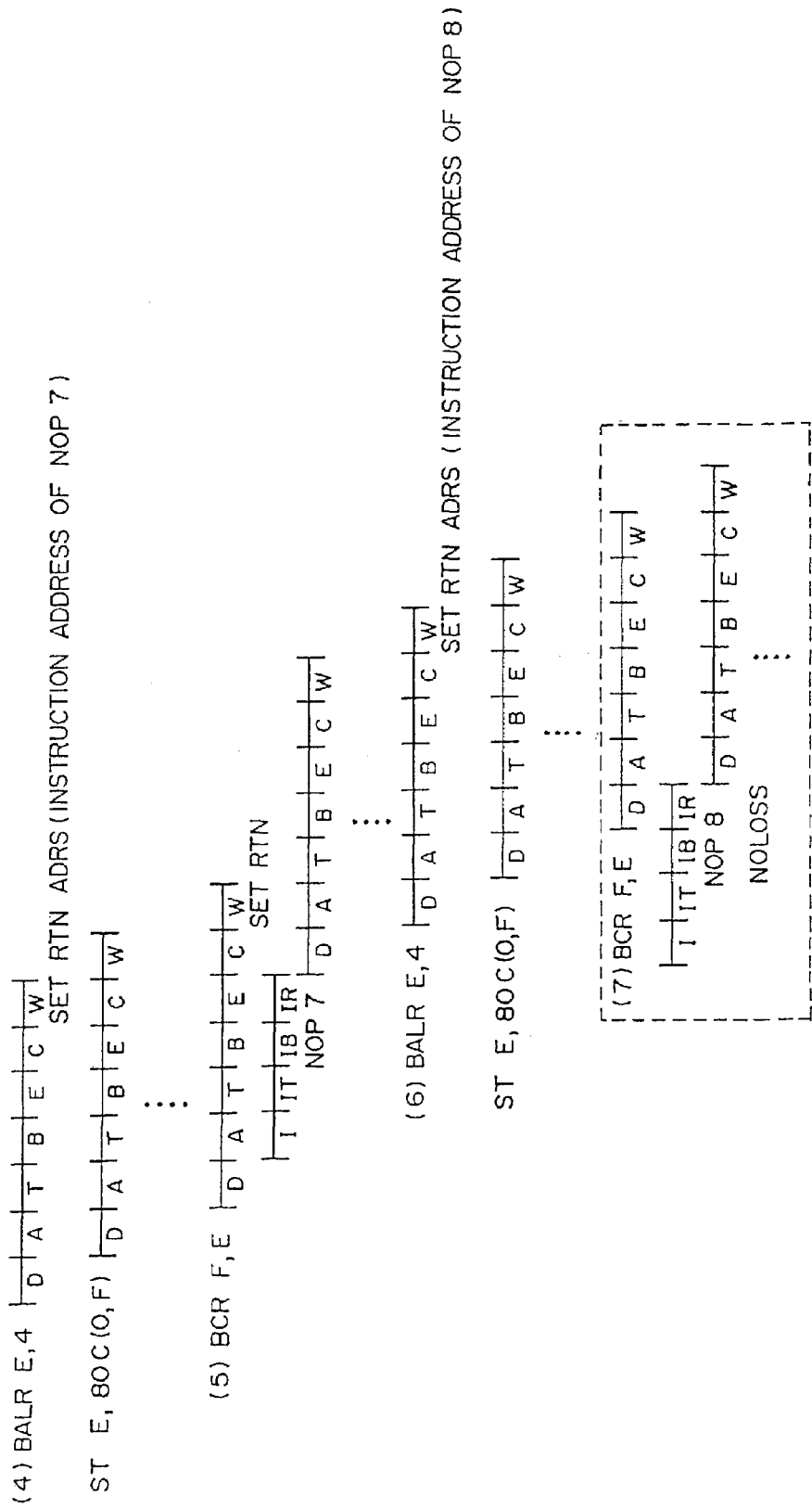
FIG. 11 shows an instruction processing operation using a return address stack.

FIG. 11 shows the operation of processing an instruction using a return address stack. In FIG. 11, when the subroutine call instruction (4) is completely executed, the instruction address of the NOP7 is set as a return address in the return address stack. Then, after the decoding cycle of the subroutine return instruction (5), the instruction NOP7 is fetched as a returned-to instruction, and the instruction NOP7 is executed.

When the next subroutine call instruction (6) is executed, the instruction address of the NOP8 is set in the return address stack, and the returned-to instruction, that is, the NOP8, is executed immediately after the decoding cycle of the subroutine return instruction (7).

The instruction NOP8 is fetched prior to the execution of the subroutine return instruction (7) because the instruction is detected as a hit in the return address stack. Although the branch history stores the instruction address of the NOP7 as a return address when the subroutine return instruction (5) is executed, the branched-to address registered in the branch history is compared with the return address stored in all valid entries in the return address stack when there is a hit in the branch history as described later according to the first embodiment of the present invention. If there are matching addresses, then the matching addresses are used as a return address. If there are no matching addresses, then the contents of the leading entry of the return address stack are used as a return address. Thus, the instruction can be quickly fetched.

FIGS. 9 and 10 show the operations performed on the sequence of instructions of the instruction (8) and the subsequent instructions in the sequence of instructions shown in FIG. 8. However, since the operations are almost the same as those described above, the detailed description is omitted here. The instructions (4) through (7) are repeated after the instruction (9), and the instruction (10) returns control to the instruction NOP6 as a returned-to instruction. Similarly, after executing the instruction (12), the instructions (3) through (10) are repeated, and the instructions (2) through (13) are repeated after executing the instruction (15).

Thus, by fetching a branched-to instruction of a subroutine return instruction using a return address stored in the leading entry in the return address stack, the problem with the conventional technology as described above by referring to FIGS. 1A and 1B can be solved. However, when a plurality of return instructions corresponding to respective subroutines are close to one another in order of processing steps, it is predicted that it may be inappropriate to use a return address stored in the leading entry as is.

As described above, the pushing and popping operations of the return address stack are respectively performed when a subroutine call instruction and a subroutine return instruction are completely executed. However, the branch history and the return address stack are searched not in synchronization with these operations, but in synchronization with the instruction fetching operation.

In the instruction fetching operation, the most probable sequence of instructions is first read and executed based on the prediction. Therefore, when a plurality of return instructions corresponding to respective subroutines are close to one another in order of processing steps, the second subroutine return instruction corresponding to the subroutine call instruction in the previous stage can be fetched before executing the first subroutine return instruction corresponding to the subsequent subroutine call instruction.

In this case, after executing the subroutine call instruction at the subsequent stage, the leading entry of the return address stack stores the address of the instruction after the subroutine call instruction, that is, the return address of the first subroutine return instruction to encounter. At this time, the address of the instruction after the subroutine call instruction executed at the previous stage is pushed, and stored in the second entry. The return instruction corresponding to the subroutine call instruction at the previous stage is the second return instruction to encounter.

Since the popping operation of a stack is performed when a subroutine return instruction is completed, the popping operation of the stack is not performed when the first return instruction is fetched. At this time, the leading entry of the return address stack stores the address of the instruction after the call instruction at the subsequent stage, that is, the return address for the first return instruction. The second entry stores the address of the instruction after the call instruction at the previous stage, that is, the return address for the second return instruction.

A popping operation of a stack is not performed before completing the execution of the first subroutine return instruction. If the second return instruction is fetched before the completion of the execution of the first return instruction, the return address of the first return instruction stored in the leading entry is defined as a predicted branched-to address, thereby interfering with the use of the correct branched-to address stored in the second entry. The first and second embodiments of the present invention are designed to process a sequence of instructions at a high speed with high reliability in consideration of the above described case.

Described below is the first embodiment of the present invention. FIG. 12 is a block diagram of the configuration according to the first embodiment of the present invention. In FIG. 12, a unit also shown in FIG. 2 is assigned the same unit number.

According to the first embodiment of the present invention, a branch history is searched before executing the branch instruction fetched from the main storage device. When it is recognized that the branch instruction is a return instruction of the subroutine according to a flag stored in the branch history, and a return flag described below, each of the return addresses stores in a plurality of valid entries in the return address stack is compared with a branched-to address registered in the branch history. When any of the return addresses stored in the return address stack matches a branched-to address, an instruction is fetched using the matching address as the branched-to address of a return instruction. If no return addresses in the return address stack match the branched-to address registered in the branch history, an instruction is fetched using a return address stored in the leading entry in the return address stack, that is, the STACK0.

When a subroutine call instruction corresponds one to one to a subroutine return instruction, a branch is predicted by referring to the branched-to address of the branch history. As described above, there in the problem that, when a plurality of subroutine return instructions are close one another in processing time, and when the second subroutine return instruction is fetched before the first subroutine return instruction corresponding to the subroutine call instruction at the subsequent stage is completely executed, the leading entry of the return address stack is referred to and is defined as a predicted branched-to address. Considering this problem, it is probable that a branch can be more correctly predicted by referring to the branched-to address of the branch history. The return address of the second subroutine return instruction should be registered in the plural stages of return address stack. It is more probable that a branch can be predicted by comparing each of the addresses with the branched-to address registered in the branch history, and by fetching an instruction using a matching address when the compared addresses match each other, thereby effectively utilizing the branch history.

In FIG. 12, an output from the selector 13 is returned to the instruction address register 11 so that, as in the case shown in FIG. 3, a predicted branched-to address from the return address stack or the branch history can be provided for the instruction address register 11.

Normally, the instruction address for the instruction fetched from the main storage device is generated by the instruction address generation circuit 12, and provided for an address register 71 for the branch history 18 through the selector 13 and the buffer 17 for temporarily storing an instruction address. This address is compared with the instruction address IAR registered in the branch history 18 by a comparator 72. If there are any matching addresses, and the valid bit for the entry storing the matching instruction address indicates the H level, then a branch history hit signal is output from an AND gate 73.

As shown in FIG. 3, the branch history 18 receives an instruction address (1) of a previously completed branch instruction, a branched-to address (2) of a completed branch instruction, a signal (3) indicating the validity/invalidity of an entry, and a signal (5) indicating that the completed instruction is a subroutine return instruction when the branch instruction is completed. The contents are stored in an entry as a set of data as the contents of the IAR, 37 the TIAR, the valid bit, and the return bit (return flag).

The leading entry of the return address stack 19, that is, the STACK0 receives an addition result from an adder 74, that is, a sum of the instruction address of the completed branch instruction (subroutine call instruction) and the instruction length of the subroutine call instruction, that is, the instruction address of the instruction after the subroutine call instruction. Each time a subroutine call instruction is completed, the contents of the stack are pushed, and the leading entry, that is, the STACK0, always stores the return address corresponding to the last completed subroutine call instruction.

In FIG. 12, if the instruction address of the instruction fetched from the main storage device is provided for the branch history 18 through the address register 71, and the address is retrieved from the already registered IAR, then the corresponding branched-to address TIAR is provided for a comparison unit 75. The comparison unit 75 comprises a plurality of comparators. The number of comparators is equal to the number of entries of the return address stack 19, that is, the number N of stages of the stack. Each of the comparators compares the predicted branched-to address TIAR provided by the branch history with each of the return addresses stored in the valid entries in the return address stack 19. When a matching result is output, a selector selection control signal for use in outputting a predicted branched-to address TIAR provided by the branch history 18 as a predicted branched-to address (return address) (8) is output to a selector 76.

When an output of any comparator indicates the L level, that is, any of a plurality of return addresses does not match the TIAR provided from the branch history, the selector 76 outputs the leading entry of the return address stack, that is, the return address stored in the STACK0, as a predicted branched-to address (return address) (8), and provides it for the selector 13. When the selector 76 performs switching control, the contents of the return bit indicating that a branch instruction fetched from the main storage device is a subroutine return instruction are provided by the branch history 18.

Figure 13:
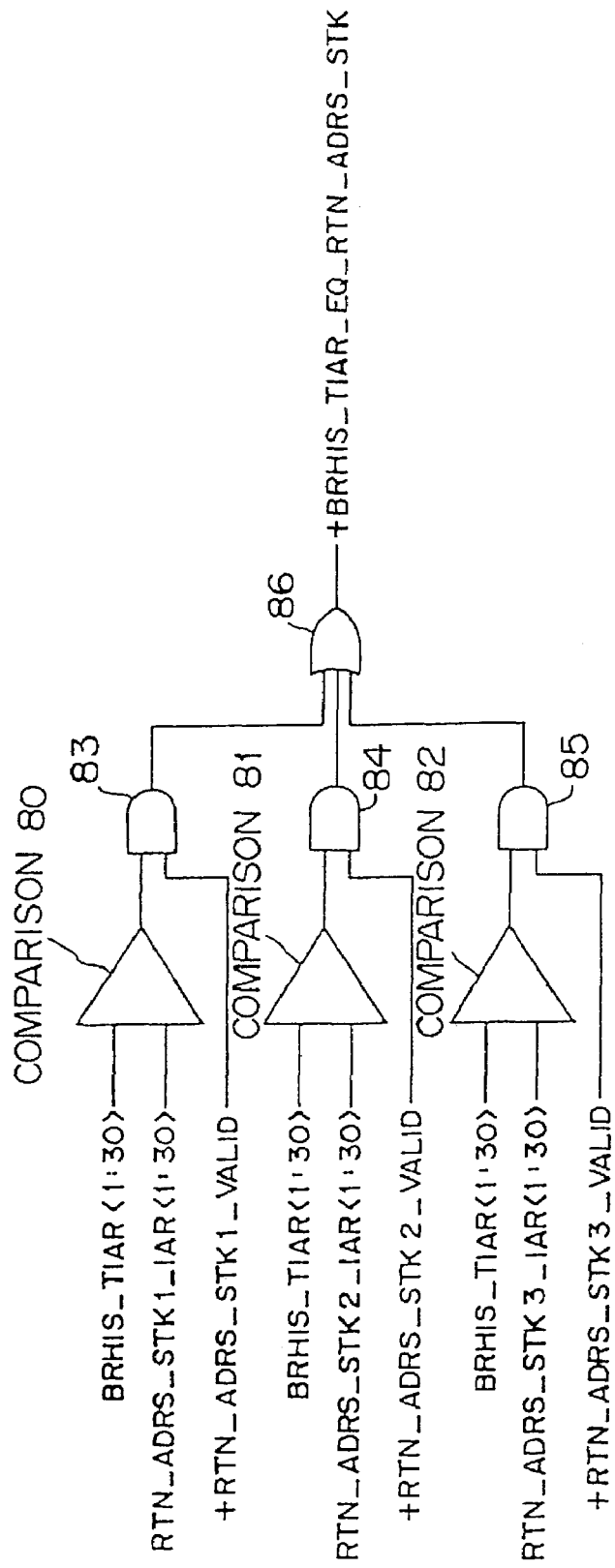
FIG. 13 is a block diagram (1) showing the configuration of a part of the address matching detection circuit according to the first embodiment of the present invention.
Figure 14:
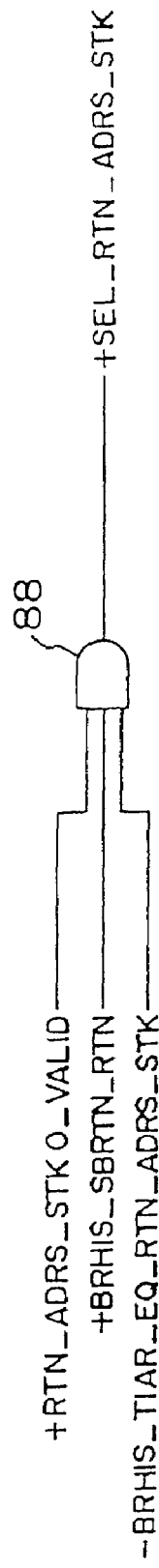
FIG. 14 is a block diagram (2) showing the configuration of a part of the address matching detection circuit according to the first embodiment of the present invention.
Figure 15:
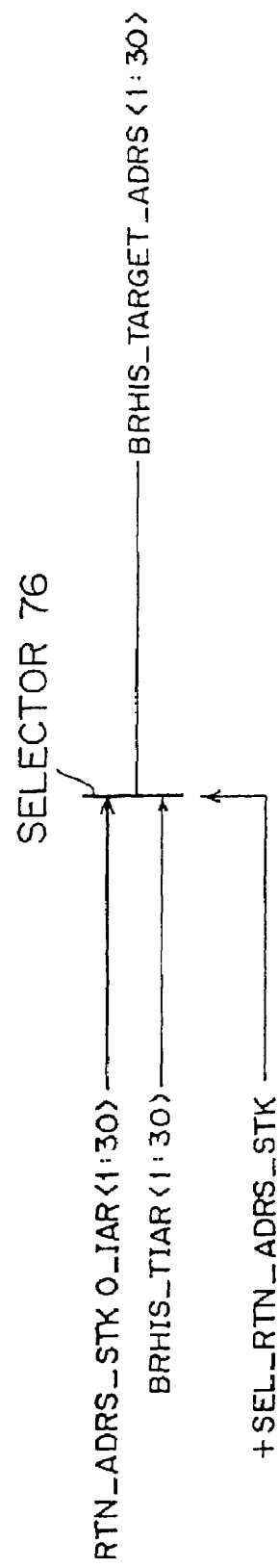
FIG. 15 is a block diagram (3) showing the configuration of a part of the address matching detection circuit according to the first embodiment of the present invention.

FIGS. 13 through 15 are block diagrams of the configuration of the address matching detection circuit for detecting a predicted branched-to address stored in the branch history matching a plurality of return addresses stored in the return address stack, and providing the predicted branched-to address (return address). FIG. 13 is a block diagram of the configuration of the address comparison unit as a part of the matching detection circuit. In FIG. 13, for example, comparators 80 through 82 compare the return addresses IAR in the STACK1, STACK2 and STACKS except the leading entry in the four-stage address stack, that is, the STACK0, with the TIAR provided by the branch history. If any comparator indicates the H level, the output is input to any of AND gates 83 through 85 together with a valid signal for the stack at the stage, and the output indicates the H level. Thus, an OR gate 86 outputs a signal indicating that the TIAR stored in the branch history has matched any of the plurality of return addresses stored in the return address stack.

In FIG. 13, the return address stored in the leading entry, that is, the STACK0, is not compared with the TIAR provided by the branch history because, if there is no return address matching the TIAR including the leading entry, the address stored in the leading entry is used as a return address, if the address stored in the leading entry matches the TIAR from the branch history, the value is used as a return address, and if the stored contents of the leading entry are used, the existence/non-existence of the matching with the TIAR does not count.

FIG. 14 shows the configuration of the return address stack selection signal output circuit for providing for the selector 76 shown in FIG. 12 a return address stack selection signal for selection of the contents of the leading entry stored in the return address stack. In FIG. 14, an AND gate 88 for outputting the selection signal outputs a signal indicating that the return address stack should be selected when the valid signal for the STACK0, which is the first input, indicates the H level, the return bit as the second input indicates the H level, and the TIAR as the third input matches any of the return addresses in the stack, that is, the output from the OR gate 86 shown in FIG. 13 indicates the L level.

FIG. 15 shows an example of the configuration of the selector circuit for outputting a predicted branched-to address (return address). In FIG. 15, the selector 76 receives the return address stored in the leading entry of the return address stack, that is, the STACK0, and the TIAR as a predicted branched-to address provided by the branch history. It selects the return address of the leading entry of the return address stack when the output from the AND gate 88 shown in FIG. 14 indicates the H level, selects the TIAR from the branch history when the output indicates the L level, and outputs the selected address as a predicted branched-to address (return address) (8).

Figure 16:
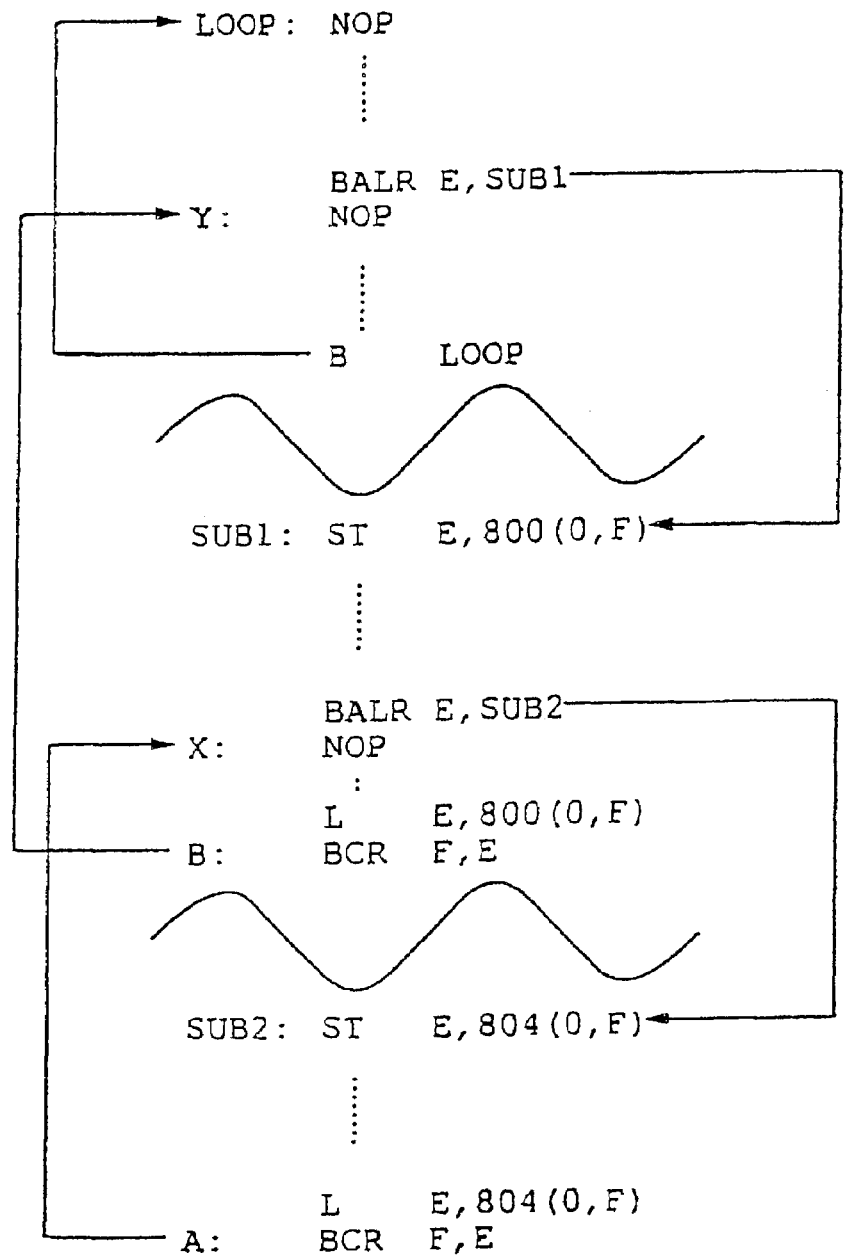
FIG. 16 shows an example of a sequence of instructions containing two types of repeatedly called subroutines.
Figure 17:
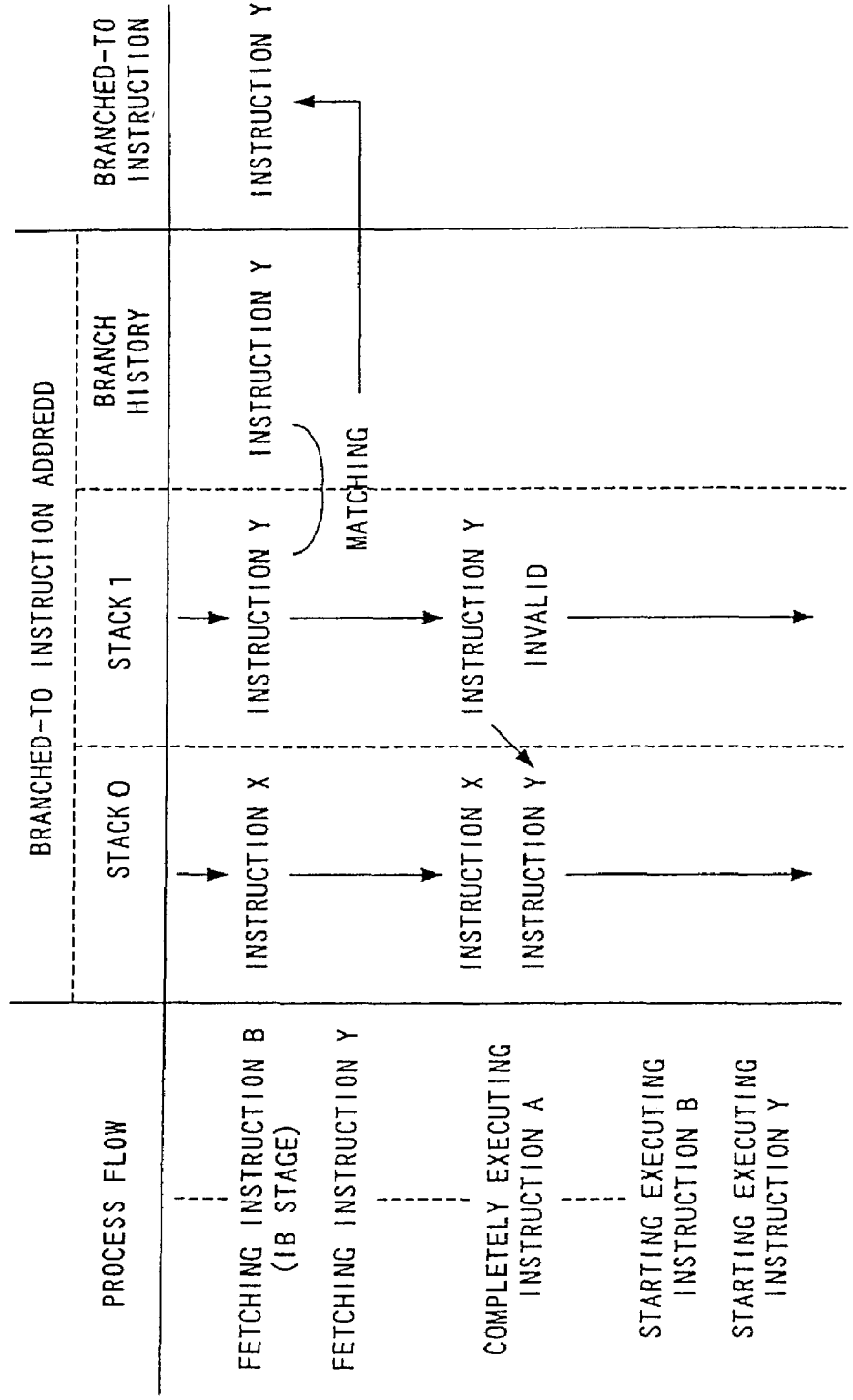
FIG. 17 shows the branched-to address registered in the branch history when the sequence of instructions shown in FIG. 16 is executed, and the contents of each stage stored in the return address stack.

FIG. 16 shows an example of a sequence of instructions containing two types of repeatedly called subroutines. FIG. 17 shows the branched-to address registered in the branch history when the sequence of instructions is executed, and the contents of the stack at each stage stored in the return address stack.

In FIG. 16, a return address to an instruction Y is registered as the branched-to address of an instruction B, that is, the BCR instruction in the branch history by repeatedly executing the above described subroutines. At the point of the IB stage (cycle) of the instruction fetch pipeline for the instruction B, the predicted branched-to address stored in the branch history as shown in FIG. 17 is a return address to the instruction Y as described above.

At this time, if the instruction A has not been completed, the subroutine call instruction (BALR E, SUB2) for calling the subroutine 2 is completely executed, thereby storing the return address to the 42 returned-to instruction, that is, the instruction X, in the leading entry of the return address stack, that is, the STACK0, and the subroutine call instruction (BALR E, SUB1) of the previous subroutine 1 is completely executed, thereby pushing the return address to the instruction Y stored in the return address stack to the STACK1.

Therefore, at the IB stage of the instruction fetch pipeline for the instruction B, it is detected that the predicted branched-to address stored in the branch history matches the return address stored in the STACK1,and the address of the instruction Y as a branched-to instruction is used as the address of the instruction fetch, thereby fetching the instruction Y. Then, after the instruction A has been completely executed, a popping operation is performed on the return address stack, and the return address to the instruction Y stored in the STACK1 is popped to the STACK0.

FIG. 18 shows the process performed on the sequence of instructions shown in FIG. 16. In FIG. 18, the address of the instruction Y is detected as an address of the branched-to instruction at the IB stage of the instruction B as described above by referring to FIG. 17, and the instruction Y can start immediately after the decoding cycle of the instruction B.

Figure 19:
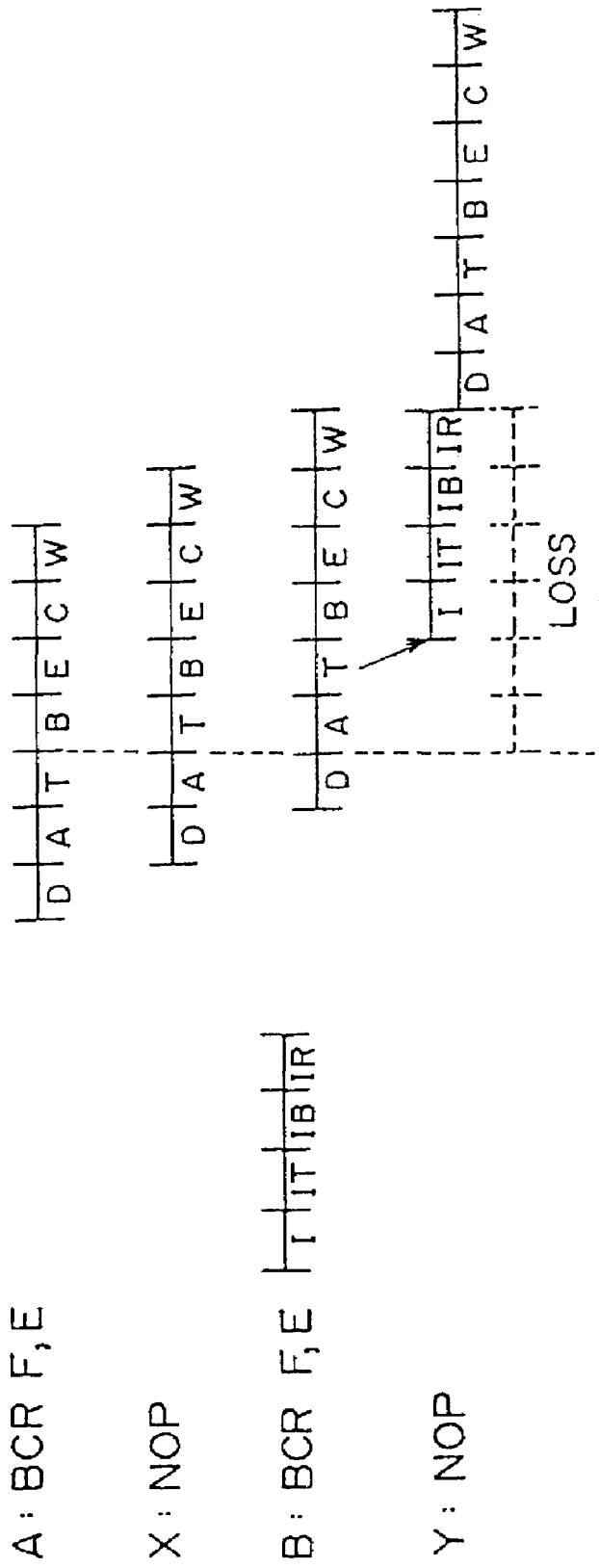
FIG. 19 shows the processing operation when, unlike the present invention, an instruction is fetched using the return address stored in the leading entry of the return address stack.

FIG. 19 shows the process, unlike the present invention, performed when an instruction is fetched using a return address stored in the leading entry, that is, the STACK0, without detecting the matching between the contents stored in the branch history and a plurality of return addresses in the return address stack. In the IB stage of the instruction fetch pipeline of the instruction B, when an instruction is fetched using a return address to the instruction X as the contents of the leading entry stored in the return address stack, that is, the STACK0, the process abnormally terminates.

It is detected that the process abnormally terminates only after the correct branched-to address is computed on the address computation cycle A of the execution pipeline of the instruction B, and it is compared with the predicted return address, that is, the return address to the instruction X, on the cycle T. Although the instruction Y is fetched immediately after the detection, the execution of the instruction is delayed by 6 cycles (6 z) as compared with the case shown in FIG. 18.

Figure 20:
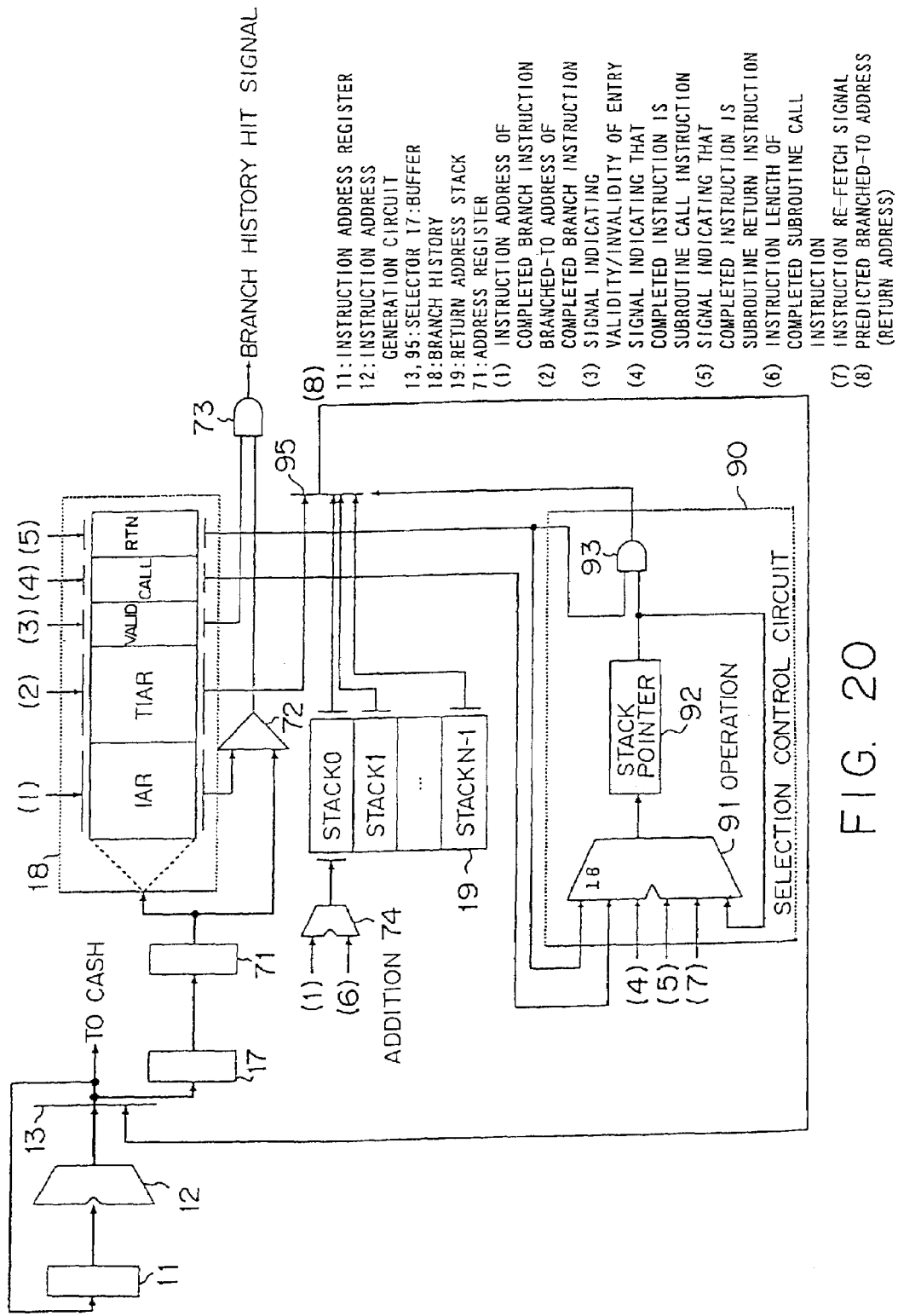
FIG. 20 is a block diagram of the detailed configuration according to the second embodiment of the present invention.

FIG. 20 is a block diagram of the configuration 44 according to the second embodiment of the present invention. When FIG. 20 is compared with FIG. 12 showing the first embodiment, the configuration shown in FIG. 20 comprises a selection control circuit 90 which replaces the comparison unit 75 and contains a stack pointer. The stack pointer points to any of a plurality of entries in the return address stack, that is, any of plural stages of stacks.

The stack pointer is operated corresponding to the contents of the call bit and the return bit obtained as a result of searching the branch history performed in synchronization of an instruction fetching operation as described later, and is also operated to match the operation of the return address stack when a branch instruction is completed. In this operation, a non-existing entry may be pointed to, but this can be allowed. In addition, when a correct instruction should be re-fetched with the execution result of the instruction executed using a wrong predicted branched-to address nullified, the stack pointer is returned to point to the leading entry of the return address stack.

According to the second embodiment of the present invention, a branch history is searched prior to the execution of an instruction fetched from the main storage device. When the return bit of a retrieved instruction indicates the H level, it is recognized that the branch instruction is a subroutine return instruction. When the entry of the return address stack specified by the stack pointer is valid, the contents of the entry are read, and an instruction is fetched using the read contents as a branched-to address. When a valid entry is not specified, for example, when a non-existing entry is specified, an instruction is fetched using the branched-to address stored in the branch history as a predicted value.

As a result, it is more probable that a branch can be predicted in the subroutine return instruction, thereby effectively utilizing the branch history. Thus, according to the second embodiment in which a stack pointer is used, the reliability in predicting a branch is higher for the following reason than according to the first embodiment in which matching addresses are detected as described above.

Normally, a subroutine is called from various points, and a subroutine return instruction has different branched-to (returned-to) instructions. In the method of detecting matching addresses, the performance in predicting a branch can be improved only when a subroutine is called from the same points. If different branched-to instructions are specified, the performance cannot be improved because no matching returned-to addresses can be detected in a matching detecting process.

In the above described case, a correct returned-to address can be pointed to using' the stack pointer under the control described later, thereby successfully contributing to the improvement of the performance. As described above, there are normally few cases in which a non-existing entry is specified. In addition, specifying a non-existing entry means that a corresponding returned-to address is not stored in the return address stack. Therefore, a correct returned-to address cannot be retrieved according to the first embodiment in which matching addresses are to be retrieved. As a result, the reliability in predicting a branch is higher according to the second embodiment in which a stack pointer can be used.

In FIG. 20, an operations unit 91 computes a pointer value to be pointed to by a stack pointer 92. The operations unit 91 is provided with the contents of the call bit (call flag) and the return bit (return flag) of the instruction stored in the branch history, a signal (4) indicating that the completed instruction is a subroutine call instruction, a signal (5) indicating that the completed instruction is a subroutine return instruction, an instruction re-fetch signal (7), and a value currently pointed to by the stack pointer 92. The operations unit 91 computes the value to be pointed to by the stack pointer 92 using the above listed inputs, and provides the result for the stack pointer 92.

The output from the stack pointer 92 is input to an AND gate 93. The AND gate 93 receives the contents of the return bit indicating that the instruction fetched from the main storage device is a subroutine return instruction, and outputs a selection control signal for a selector 95 when the return bit indicates the H level.

The selector 95 selects either the contents of an entry depending on the value of the selection control signal when the entry is a valid entry in the return address stack, and is specified by the point value of the stack pointer 92, or the branched-to address TIAR stored in the branch history when an invalid entry is specified by the point value, and provides the selection result as a predicted branched-to address (return address) (8) for the selector 13.

Figure 21:
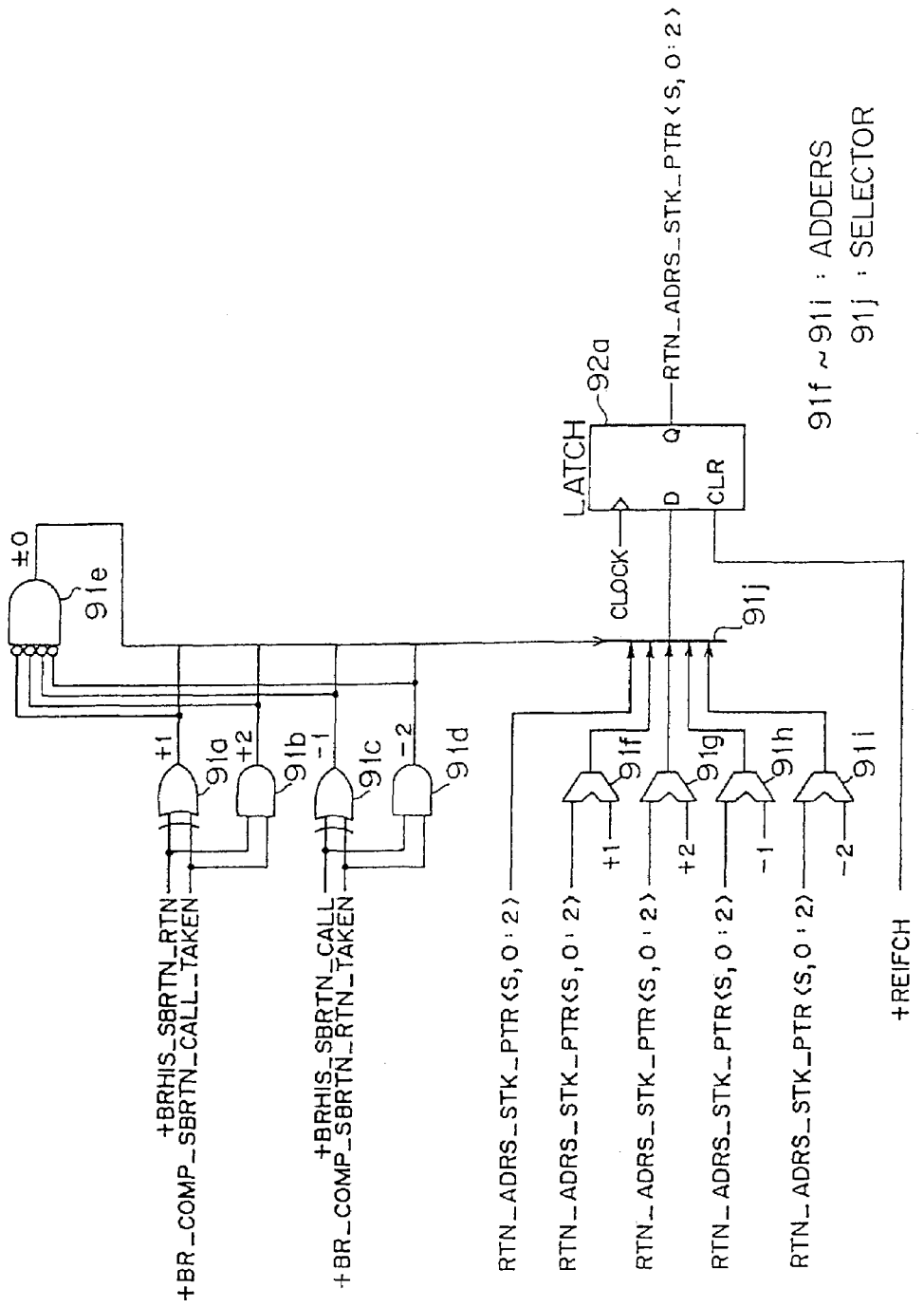
FIG. 21 is a block diagram (1) of the detailed configuration of a part of the selection control circuit in FIG. 20.
Figure 22:
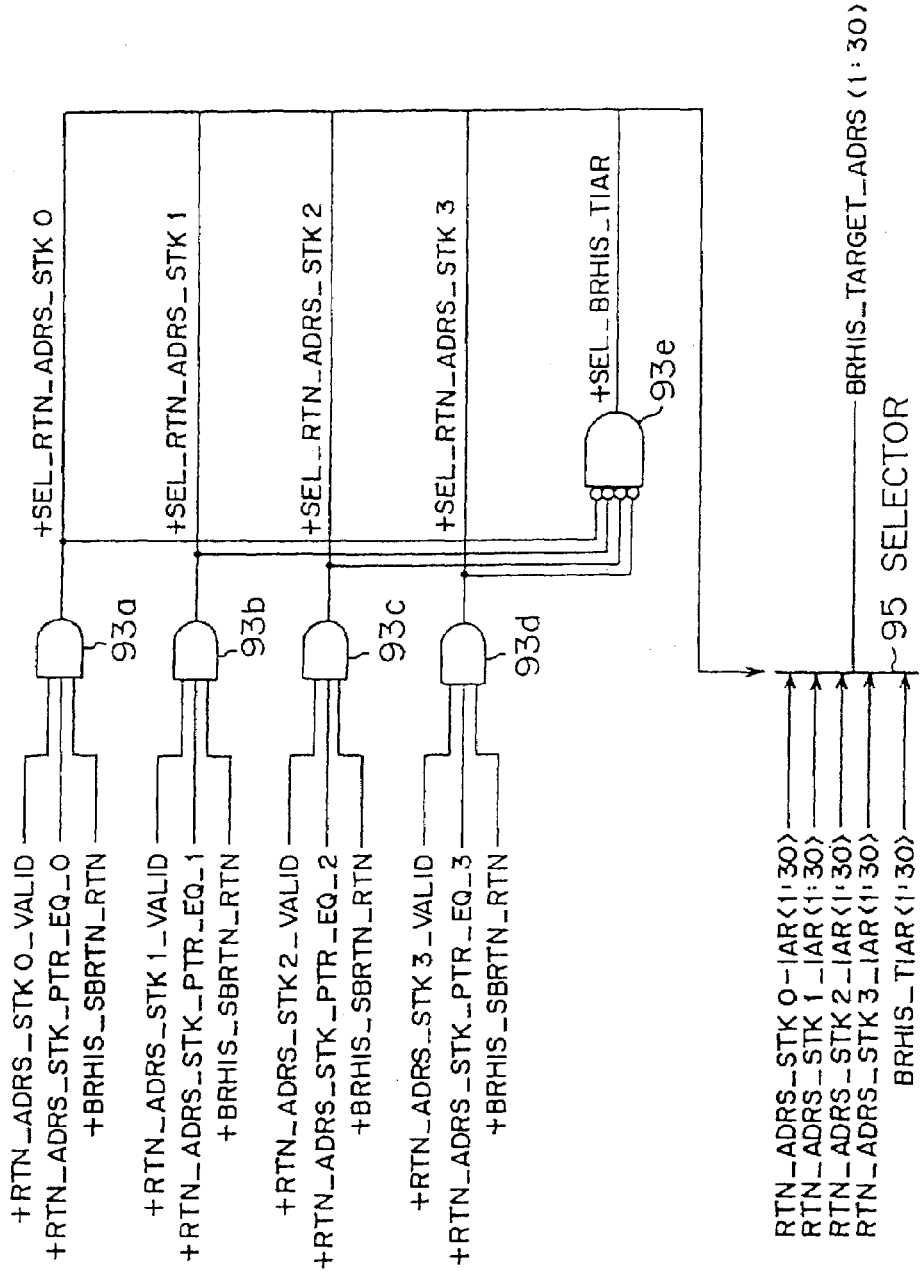
FIG. 22 is a block diagram (2) of the detailed configuration of a part of the selection control circuit in FIG. 20.

The contents of the call bit stored in the branch history is set to 1 when a branch instruction is completed and it is a subroutine call instruction. FIGS. 21 and 22 are block diagrams of the detailed configurations of the selection control circuit 90 containing the selector 95. FIG. 21 shows an example of the detailed configuration of the operations unit 91 and the stack pointer 92 in the selection control circuit 90. In FIG. 21, the stack pointer 92 corresponds to a latch 92a, and the other portions correspond to the operations unit 91. The latch 92a uses a counter (the same as the non-sign binary counter as a physical circuit) logically indicating a sign, but the number of bits is to be set to prevent a malfunction by overflow.

According to the second embodiment, the point value of the stack pointer is incremented by 1 when it is recognized according to the contents of the return flag that the instruction fetched from the main strage device in searching the branch history is a subroutine return instruction, and when the subroutine call instruction is completely executed. The point value of the stack pointer is decremented by 1 when it is recognized according to the contents of the call flag that the instruction fetched from the main strage device is a subroutine call instruction, and when the subroutine return instruction is completely executed.

In FIG. 21, if two input to an latch 91b is H, that is, the contents of the return bit in the branch history indicate the H level, a branch for the subroutine call instruction is taken, and the signal indicating that the subroutine call instruction has been completely executed, that is, 'a logical product of the two inputs for the AND gate 21 shown in FIG. 4A, is input as the H level, then the output from the latch 91b indicates the H level, and a signal for controlling the selection by the selector 91j is output such that the selector 91j outputs to the latch 92a the output from a adder 91g, that is, the value obtained by adding 2 to the current pointer value.

When any of the two inputs to the latch 91b indicates the H level, the output from an adder 91f, that is, the value obtained by adding 1 to the current point value, is selected by the selector 91j, and provided for the latch 92a.

When the contents of the call flag indicate the H level, the branch of the subroutine return instruction is taken, and the signal indicating that the execution of the instruction has been completed indicates the H level, then, according to the output from an AND gate 91d, the output from an adder 91i, that is, the value obtained by subtracting 2 from the current point value, is selected by the selector 91j, and is provided for the latch 92a. If any of the signals indicates the H level, the output from an adder 91h, that is, the value obtained by subtracting 1 from the current point value, is selected by the selector 91j according to the output from an EX OR gate 91c, and is provided for the latch 92a. If any outputs from the tour gates 91a through 91d indicate the L level, the current point value itself is selected by the selector 91j according to the output from a NAND gate 91e, and is provided for the latch 92a.

Furthermore, when the signal indicating re-fetching an instruction is input to the clear terminal of the latch 92a, then the latch 92a is cleared, and the point value points to the leading entry of the return address stack.

FIG. 22 is a block diagram of the detailed configuration corresponding to the AND gate 93 and the selector 95 in the selection control circuit 90. The selector 95 selects any of the return addresses IAR stored in the STACK0, STACK1 and STACK2 in the return address stack, or one of the five branched-to addresses stored in the branch history, and provides the selected address as a predicted branched-to address (return address) for the selector 13.

The selection control signal of the selector 95 is provided by the outputs from four AND gates 93a through 93d and a NAND gate 93e. For example, the AND gate 93a outputs a control signal to have the selector 95 select the return address of the leading entry of the return address stack, that is, the STACK0. The first input to the AND gate 93a is a signal indicating that the STACK0 of the return address stack is valid. The second input is a signal indicating that the value of the stack pointer is 0.The third input is a signal indicating that the contents of the return bit of the branch history refer to the H level.

The outputs of the AND gate 93b for outputting a selection control signal indicating that a return address stored in the STACK1 is to be selected; the AND gate 93c indicating that a return address stored in the STACK2 is to be selected; and the AND gate 93d indicating that a return address stored in the STACK3 is to be selected are obtained corresponding to the similar inputs to those described above. When the outputs from these four AND gates 93a through 93d indicate the L level, the branched-to address TIAR stored in the branch history is selected according to the output from the NAND gate 93e.

FIG. 23 shows an example of a stack pointer corresponding to the execution of the sequence of instructions explained by referring to FIG. 16, and an example of the operation of the return address stack. First, during the execution of the subroutine starting with the SUB2 shown in FIG. 16, the STACK0 of the return address stack stores the return address to the instruction X as a returned-to instruction corresponding to the subroutine call instruction. The STACK1 stores the return address to the instruction Y as a returned-to instruction corresponding to the call instruction of the previously called subroutine SUB1. However, the stack pointer points to the STACK0 storing the returned-to address of the call instruction for the subroutine SUB2 being executed.

In the IB stage of the instruction fetch pipeline of the instruction A, it is recognized according to the return flag indicating the contents stored in the branch history that the instruction A is a subroutine return instruction, the return address to the instruction X stored in the STACK0 is the branched-to address of the instruction A, the instruction X is fetched in the IR stage of the instruction A, the stack pointer is incremented by 1,and the entry pointed to by the stack pointer is the STACK1.

Then, before the instruction A is completely executed, it is recognized according to the return flag of the branch history in the IB stage of the instruction fetch for the instruction B that the instruction B is a subroutine return instruction, the return address to the instruction Y stored in the STACK1 is the branched-to address of the instruction B. The instruction Y is fetched in the IR stage, the stack pointer is incremented by 1,and the entry pointed to by the stack pointer is the STACK2.

When the instruction A is completely executed, the popping operation of the return address stack is performed, and the return address to the instruction Y is popped from the STACK1 to the STACK0. Simultaneously, the point value of the stack pointer is decremented by 1,and the entry pointed to by the stack pointer is the a STACK1. Then, the execution of the instructions B and Y is started, the contents of the STACK0 stored in the return address stack are nullified when the instruction B is completely executed, the point value of the stack pointer is decremented by 1,and the entry pointed to by the stack pointer is the STACK0.

Thus, according to the second embodiment, regardless of whether or not the branched-to address stored in the branch history is correct, a correct recognized as a subroutine call instruction according to the contents of the call bit, the value of the stack pointer is decremented by 1,and the point value is −1.

Then, the branch history is searched on the IT cycle when the subroutine return instruction R is fetched, and the instruction is recognized as a subroutine return instruction according to the contents of the return flag. Simultaneously, the return address stack is also searched. However, since the value of the stack pointer is −1, the branched-to address stored in the branch history is used as a predicted branched-to address for the instruction R.

On the next cycle, the value of the stack pointer is incremented from −1 to 0.Then, upon completion of the execution of the subroutine call instruction C, the STACK0 of the return address stack stores the return address to the instruction N as a returned-to instruction of the corresponding subroutine return instruction, an the value of the stack pointer is 1 after being incremented by 1.

Thus, it is necessary for the stack pointer to point to a non-existing negative value so the correspondence of the stacks can be correctly maintained. When a predicted branch is correctly taken, and an instruction is not re-fetched, the process continues without resetting the value of the stack pointer. Therefore, it is necessary to point to a virtual entry using a negative pointer value.

On the other hand, when a too large non-existing entry number is pointed to, a branched-to address as the contents stored in the branch history which can store a correct branched-to address is used as a predicted branched-to address. As compared with the case in which a return address stored constantly in the leading entry is used as a predicted branched-to address, it is more reliable to use the contents stored in the branch history because there is no possibility that a correct return address can be stored in any entry of the return address stack.

Especially, in the actual circuit, the number of stages of the stack is physically limited. The stack pointer can point to a value beyond the limit, and the value of the stack pointer can be a negative value. However, the entry of the stack actually starts with 0,and only positive entry numbers exist. To maintain the correspondence with the stacks, however, it is necessary to hold a negative value or a physically too large value as a value of the stack pointer. Therefore, although a physically available value range instruction can be fetched by using the return address stored in the entry pointed to by the stack pointer as a branched-to address. Also according to the second embodiment, the process of an instruction in the sequence of instructions shown in FIG. 16 is performed as shown in FIG. 18, and the instruction can be processed at a higher speed than in the case in which simply the contents of the leading entry of the return address stack are used as shown in FIG. 19.

Figure 24:
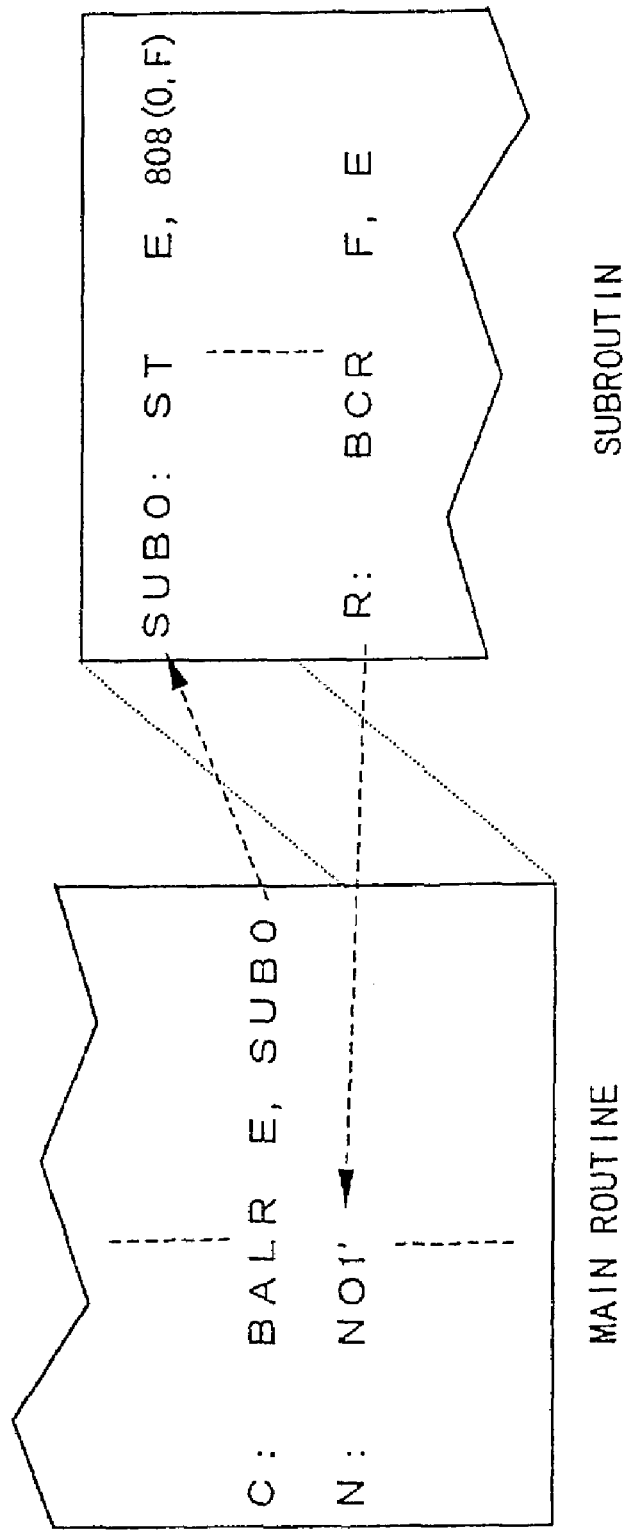
FIG. 24 shows an example of a sequence of instructions for the case in which a stack pointer points to a virtual entry which does not actually exist.

According to the second embodiment, the reason for the possibility that the stack pointer points to a non-existing virtual entry is described below by referring to FIGS. 24 through 26. FIG. 24 shows an example of a sequence of instructions corresponding to the case. In FIG. 24, it is assumed that the only subroutine is SUB0, the subroutine is short, and a subroutine return instruction R is fetched before the corresponding subroutine call instruction is completely executed.

Figure 25:
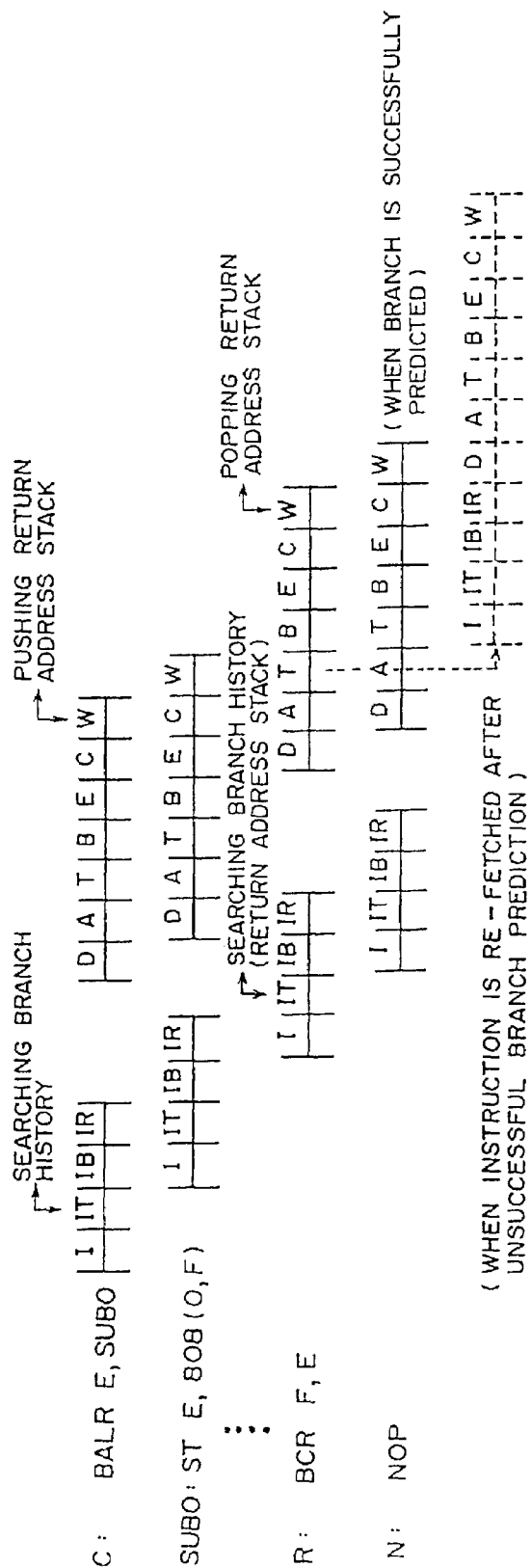
FIG. 25 shows an operation of processing the sequence of instructions shown in FIG. 24.
Figure 26:
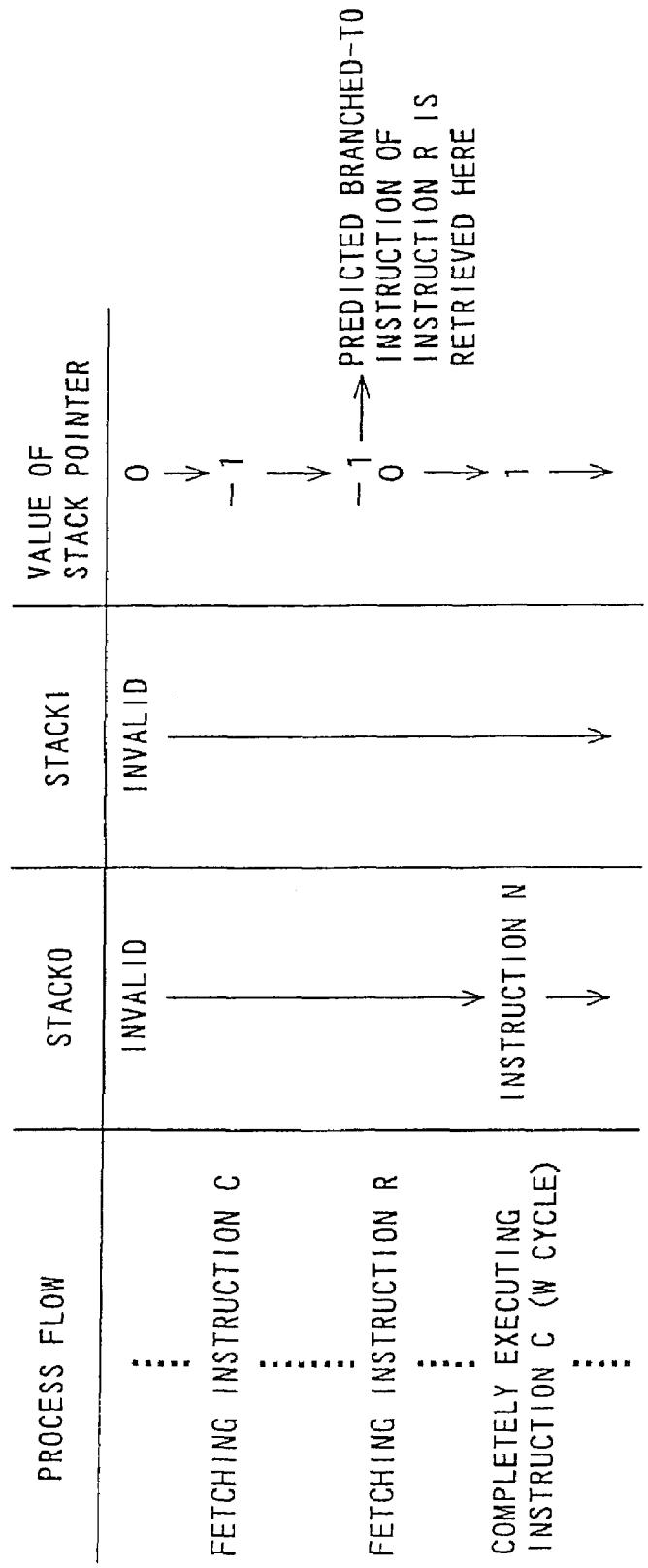
FIG. 26 shows a change of the value of the stack pointer for the process of the sequence of instructions shown in FIG. 24.

FIG. 25 shows the process for the sequence of instructions shown in FIG. 24. FIG. 26 shows a change of the value of the stack pointer corresponding to the process. In FIG. 25, when the branch history is searched on the IT cycle when the subroutine call instruction C is fetched, and the instruction is entered as a result of the operations of the subsequent values of the pointer, the consistency with the stacks can be correctly maintained.

As described above in detail, according to the first embodiment of the present invention, when an instruction fetched from the main storage device and detected as a hit in the branch history is a subroutine return instruction, the branched-to address stored in the branch history is compared with all return addresses stored in the valid entries in the return address stack. When the branched-to address stored in the branch history matches any of the return addresses, an instruction can be fetched using the address, thereby processing the sequence of instructions containing the subroutine at a high speed.

Furthermore, according to the second embodiment, when an instruction fetched from the main storage device and detected as a hit in the branch history is a subroutine return instruction, an instruction can be fetched using a return address stored in the entry pointed to by the stack pointer in the return address stack, thereby processing the sequence of instructions containing the subroutine at a higher speed with the reliability equal to or higher than the reliability obtained according to the first embodiment, and largely contributing to the improvement of the performance of the information processing device.

What is claimed is:

1. An instruction fetch control apparatus having a branch history in which an instruction address of a branch instruction and an address of a branched-to instruction for use when a branch is taken are registered as a set of data for the branch instruction, and a return address stack having a top-of-stack and pushing a returned-to instruction address of a subroutine when a subroutine call instruction is completely executed, and popping the return address stack when a subroutine return instruction is completely executed, comprising:
    an instruction execution completion notifier reporting completion of instruction execution; and
    an entry designation unit predicting a return address of a subroutine during an instruction fetching by designating as a predicted return address a designate entry in the return address stack storing return addresses of subroutine calls and fetching a predicted return address of a subroutine using the return address stored in a designate entry of the return address stack,
    wherein the entry designation unit computes a position of a designate entry in the return address stack relative to a leading entry of the return address stack by:
        when a subroutine call instruction is predicted during an instruction fetching, changing the designate entry independently of a push or pop operation of the return address stack to indicate a one-step shallower entry of the return address stack relative to the leading entry of the return address stack,
        when a subroutine return instruction is predicted during an instruction fetching, changing the designate entry independently of a push or pop operation of the return address stack to indicate a one-step deeper entry of the return address stack relative to the leading entry of the return address stack and, and
        changing the designate entry depending upon a push and pop operation of the return address stack when a subroutine call and a subroutine return instruction is completely executed according to the reporting of completion of instruction execution,
    thereby keeping a position of the designate entry relative to the leading entry of the return address stack, and
    wherein the entry designation unit designates an entry in the return address stack as a predicted return address of a subroutine under a condition that an instruction is fetched from a main storage device, the instruction is detected as a hit in the branch history, and the instruction is determined as a return instruction from a subroutine.

2. The apparatus according to claim 1, further comprising:
    a return flag storage area, in the branch history, storing a flag indicating an instruction is a subroutine return instruction, wherein
    said entry designation unit recognizes, according to contents of said return flag storage area, that an instruction fetched from the main storage device is the return instruction of the subroutine.

3. The apparatus according to claim 2, wherein when it is recognized, according to the contents of the return flag storage area, that the instruction fetched from the main storage device and detected as a hit in the branch history is the return instruction of the subroutine, a position of the designate entry is increased by one relative to the leading entry of the return address stack prior to the execution of the return instruction, as a one-step shallower entry indication.

4. The apparatus according to claim 3, wherein said entry designation unit decreases, relative to the leading entry of the return address stack, a position of the designate entry by one when the return instruction of the subroutine is completely executed.

5. The apparatus according to claim 1, further comprising:
    a call flag storage area, in the branch history, storing a flag indicating an instruction is a subroutine call instruction, wherein
    when it is recognized, according to the contents of the call flag storage area, that an instruction fetched from the main storage device and detected as a hit in the branch history is a call instruction of a subroutine, a position of the designate entry is decreased by one relative to the leading entry of the return address stack prior to execution of the call instruction, as a one-step deeper entry indication.

6. The apparatus according to claim 5, wherein said entry designation unit increases a position of the designate entry by one relative to the leading entry of the return address stack when the call instruction of the subroutine is completely executed.

7. The apparatus according to claim 1, wherein said fetched instruction is not to be executed, and, when an instruction to be executed is re-fetched, said entry designation unit returns a position of the designate entry to the leading entry of the return address stack.

8. The apparatus according to claim 1, wherein when said entry designation unit designates an invalid designate entry in the return address stack, an instruction is fetched using a branched-to address stored in the branch history.

9. The apparatus according to claim 1, wherein said entry designation unit can designate a non-existing virtual entry in the return address stack.

10. An information processing device, comprising:
an instruction fetch controller to control executing:
maintaining a branch history in which an instruction address of a branch instruction and an address of a branched-to instruction for use when a branch is taken are registered as a set of data for the branch instruction;
maintaining a return address stack having a top-of-stack and pushing a returned- to instruction address of a subroutine when a subroutine call instruction is completely executed and popping the return address stack when a subroutine return instruction is completely executed;
reporting completion of instruction execution;
predicting a return address of a subroutine during an instruction fetching by designating as a predicted return address a designate entry in the return address stack storing return addresses of subroutine calls; and
fetching a predicted return address of a subroutine using the return address stored in a designate entry of the return address stack,
wherein the designating of the designate entry in the return address stack includes computing a position of the designate entry in the return address stack relative to a leading entry of the return address stack by:
when a subroutine call instruction is predicted during an instruction fetching, changing the designate entry independently of a push or pop operation of the return address stack to indicate a one-step shallower entry of the return address stack relative to the leading entry of the return address stack,
when a subroutine return instruction is predicted during an instruction fetching, changing the designate entry independently of a push or pop operation of the return address stack to indicate a one-step deeper entry of the return address stack relative to the leading entry of the return address stack and, and
changing the designate entry depending upon a push and pop operation of the return address stack when a subroutine call and a subroutine return instruction is completely executed according to the reporting of completion of instruction execution,
thereby keeping a position of the designate entry relative to the leading entry of the return address stack, and
wherein an entry in the return address stack as a predicted return address of a subroutine is designated under a condition that an instruction is fetched from a main storage device, the instruction is detected as a hit in the branch history, and the instruction is determined as a return instruction from the subroutine.

11. An instruction fetch control method, comprising:
pushing onto a return address stack a returned-to instruction address of a subroutine when a subroutine call instruction is completely executed and popping the return address stack when a subroutine return instruction is completely executed;
determining whether a fetched instruction resulting in a hit in a branch history, containing an address of a branch instruction and a branched-to-instruction, is a return instruction;
signaling completion of instruction execution;
predicting a return address of a subroutine during an instruction fetching by designating as a predicted return address a designate entry in the return address stack storing return addresses of subroutine calls; and
fetching a predicted return address of a subroutine using the return address stored in a designate entry of the return address stack,
wherein the designating of the designate entry in the return address stack includes computing a position of the designate entry in the return address stack relative to a leading entry of the return address stack by:
when a subroutine call instruction is predicted during an instruction fetching, changing the designate entry independently of a push or pop operation of the return address stack to indicate a one-step shallower entry of the return address stack relative to the leading entry of the return address stack,
when a subroutine return instruction is predicted during an instruction fetching, changing the designate entry independently of a push or pop operation of the return address stack to indicate a one-step deeper entry of the return address stack relative to the leading entry of the return address stack and, and
changing the designate entry depending upon a push and pop operation of the return address stack when a subroutine call and a subroutine return instruction is completely executed according to the reporting of completion of instruction execution,
thereby keeping a position of the designate entry relative to the leading entry of the return address stack,
wherein an entry in the return address stack as a predicted return address of a subroutine is designated under a condition that an instruction is fetched from a main storage device, the instruction is detected as a hit in the branch history, and the instruction is determined as a return instruction from the subroutine.

* * * * *